US008068098B2

(12) United States Patent
Yoshida

(10) Patent No.: US 8,068,098 B2
(45) Date of Patent: Nov. 29, 2011

(54) ELECTRONIC PAPER RECORDING APPARATUS

(75) Inventor: Junichi Yoshida, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 842 days.

(21) Appl. No.: 11/755,867

(22) Filed: May 31, 2007

(65) Prior Publication Data

US 2007/0283248 A1 Dec. 6, 2007

(30) Foreign Application Priority Data

May 31, 2006 (JP) ................................ 2006-152774

(51) Int. Cl.
*G06F 3/041* (2006.01)
*G06F 3/03* (2006.01)

(52) U.S. Cl. ........ 345/173; 345/104; 715/773; 715/776; 715/778

(58) Field of Classification Search .................. 715/773, 715/776, 778, 790; 345/84, 86, 173, 104, 345/901, 905
See application file for complete search history.

(56) References Cited

U.S. PATENT DOCUMENTS 6,396,598 B1 * 5/2002 Kashiwagi et al. ........... 358/474
(Continued)

FOREIGN PATENT DOCUMENTS

EP 0455147 11/1991
(Continued)

OTHER PUBLICATIONS

Korean Office Action dated Nov. 25, 2009 corresponding to U.S. Appl. No. 11/755,867, filed May 31, 2007.

(Continued)

*Primary Examiner* — Nicholas Augustine
(74) *Attorney, Agent, or Firm* — Turocy & Watson, LLP

(57) ABSTRACT

An electronic paper is mounted on a paper mounting unit on which the electronic paper is mounted detachably. When a user operation is performed on the display screen of the electronic paper, the user operation position with respect to the display screen of the electronic paper is detected by the operation position detecting unit of the paper mounting unit. The data corresponding to the detected user operation position with respect to the display screen of the electronic paper is transmitted to the electronic paper via mutual communication units. The nonvolatile display unit of the electronic paper displays the data. This enables the data corresponding to the user operation on the electronic paper to be displayed on the nonvolatile display unit.

15 Claims, 31 Drawing Sheets

U.S. PATENT DOCUMENTS

| | | | | |
|---|---|---|---|---|
| 7,109,967 | B2 * | 9/2006 | Hioki et al. | 345/104 |
| 7,154,452 | B2 * | 12/2006 | Nakamura et al. | 345/1.1 |
| 7,243,840 | B2 * | 7/2007 | Bason et al. | 235/380 |
| 7,492,945 | B2 * | 2/2009 | Yamazaki et al. | 382/187 |
| 7,643,005 | B2 * | 1/2010 | Jung et al. | 345/107 |
| 7,660,835 | B2 * | 2/2010 | Hayashi et al. | 1/1 |
| 7,669,245 | B2 * | 2/2010 | Jung et al. | 726/27 |
| 2002/0055938 | A1 | 5/2002 | Matsuo et al. | |
| 2003/0020701 | A1 * | 1/2003 | Nakamura et al. | 345/204 |
| 2003/0227441 | A1 * | 12/2003 | Hioki et al. | 345/156 |
| 2004/0155833 | A1 | 8/2004 | Ishii et al. | |
| 2004/0189672 | A1 * | 9/2004 | Yamazaki et al. | 345/619 |
| 2006/0020469 | A1 * | 1/2006 | Rast | 704/270 |
| 2006/0124897 | A1 * | 6/2006 | Shingai et al. | 252/299.01 |
| 2006/0265744 | A1 * | 11/2006 | Jung et al. | 726/21 |
| 2007/0206922 | A1 * | 9/2007 | Koshimizu et al. | 386/95 |
| 2007/0208785 | A1 * | 9/2007 | Hayashi et al. | 707/203 |
| 2007/0211002 | A1 * | 9/2007 | Zehner et al. | 345/84 |
| 2009/0065767 | A1 * | 3/2009 | Reynolds et al. | 257/40 |

FOREIGN PATENT DOCUMENTS

| | | | |
|---|---|---|---|
| EP | 1276090 | | 1/2003 |
| JP | 2001-312227 | | 11/2001 |
| JP | 2001-312250 | | 11/2001 |
| JP | 2002-169190 | | 6/2002 |
| JP | 2002-300333 | | 10/2002 |
| JP | 2003-058081 | | 2/2003 |
| JP | 2003-076354 | | 3/2003 |
| JP | 2003-256190 | | 9/2003 |
| JP | 2005-221723 | | 8/2005 |
| JP | 2006-039834 | | 2/2006 |
| KR | 1020030082913 | | 10/2003 |
| WO | 02/056284 | A1 | 7/2002 |

OTHER PUBLICATIONS

International Search Report for PCT/JP2007/061403 dated Sep. 21, 2007.
Written Opinion for PCT/JP2007/061403 dated Sep. 21, 2007.
Japanese Office Action for Japanese Patent Application Serial No. 2006-152774 mailed on Jun. 7, 2011.

* cited by examiner

| ELECTRONIC PAPER | OVERLAP SENSOR | CALIBRATION POINTER | SIZE |
|---|---|---|---|
| A | ○ | ○ | A4 |
| B | ○ | × | A4 |
| C | ○ | ○ | A4 |
| D | × | ○ | A4 |
| E | ○ | ○ | B5 |

54 ELECTRONIC PAPER MANAGEMENT TABLE

| ELECTRONIC PAPER ID | OBVERSE/ REVERSE | SIZE | OVERLAP DETECTION | CORRECTION LEFT | CORRECTION RIGHT | ACTIVE |
|---|---|---|---|---|---|---|
| A | 1 | A4 | × | × | × | × |
| A | 2 | A4 | ○ | ○ | × | ○ |
| B | 1 | A4 | ○ | × | × | × |
| B | 2 | A4 | ○ | × | × | × |
| C | 1 | A4 | ○ | × | ○ | × |
| C | 2 | A4 | × | × | × | × |
| D | 1 | A4 | × | × | × | × |
| D | 2 | A4 | × | × | × | × |
| E | 1 | B5 | ○ | × | ○ | ○ |
| E | 2 | B5 | × | × | × | × |

THE SMALLER THE SIZE, THE MORE ACTIVE THE PAPER

FIG.12

55 ELECTRONIC PAPER UNIQUE INFORMATION

| ELECTRONIC PAPER ID | OBVERSE/ REVERSE | SIZE | CORRECTION POINTER 1 | CORRECTION POINTER 2 | CORRECTION POINTER 3 | CORRECTION POINTER 4 |
|---|---|---|---|---|---|---|
| A | 1 | A4 | Xa11, Ya11 | Xa12, Ya12 | Xa13, Ya13 | Xa14, Ya14 |
| A | 2 | A4 | Xa21, Ya21 | Xa22, Ya22 | Xa23, Ya23 | Xa24, Ya24 |
| B | 1 | A4 | Xb11, Yb11 | Xb12, Yb12 | Xb13, Yb13 | Xb14, Yb14 |
| B | 2 | A4 | Xb21, Yb21 | Xb22, Yb22 | Xb23, Yb23 | Xb24, Yb24 |

FIG.13

58e VIRTUAL PAPER CLIENT

| ELECTRONIC PAD ID | ELECTRONIC PAPER ID | OBVERSE/ REVERSE | ACTIVE | DEFAULT |
|---|---|---|---|---|
| あ | A | 1 | × | D11 |
| あ | A | 2 | ○ | D12 |
| あ | B | 1 | × | D21 |
| あ | B | 2 | × | D22 |
| あ | C | 1 | × | D31 |
| あ | C | 2 | × | D32 |
| あ | D | 1 | × | D41 |
| あ | D | 2 | × | D42 |
| あ | E | 1 | ○ | D51 |
| あ | E | 2 | × | D52 |

FIG.17

62 USER AUTHENTICATION TABLE

| USER ID | PASSWORD |
|---|---|
| 12301 | **** |
| 12302 | **** |
| 12303 | **** |

FIG.18

63 ELECTRONIC PAPER AUTHENTICATION TABLE

| ELECTRONIC PAPER ID | USER ID | ELECTRONIC PAD ID | ELECTRONIC PEN ID |
| --- | --- | --- | --- |
| A | 12301 | あ | ア |
| B | 12301 | あ | ア |
| C | 12301 | あ | ア |
| D | 12301 | あ | ア |
| E | 12301 | あ | ア |

FIG.19

64 ELECTRONIC PEN FUNCTION TABLE

| ELECTRONIC PEN ID | COLOR | LINE WIDTH |
| --- | --- | --- |
| ア | BLACK | THIN |
| イ | RED | MEDIUM |
| ウ | | |

FIG.20

ELECTRONIC PAPER RECORDING APPARATUS

CROSS-REFERENCE TO RELATED APPLICATIONS

This application is based upon and claims the benefit of priority from prior Japanese Patent Application No. 2006-152774, filed May 31, 2006, the entire contents of which are incorporated herein by reference.

BACKGROUND OF THE INVENTION

1. Field of the Invention

This invention relates to an electronic paper recording apparatus for causing desired information to be recorded and displayed on an electronic paper using a paper-like nonvolatile display unit.

2. Description of the Related Art

In recent years, a paper-like nonvolatile display unit called electronic paper has been developed. The electronic paper has a display surface capable of displaying and holding images with no power supply and is thin and flexible, although not as thin or flexible as actual paper. Being supplied with an electric source, the electronic paper can write and erase an image and display and hold various contents, including text and images (e.g., refer to Jpn. Pat. Appln. KOKAI Publication No. 2006-039834, Jpn. Pat. Appln. KOKAI Publication No. 2001-312227, and Jpn. Pat. Appln. KOKAI Publication No. 2003-058081).

Text data and image data displayed on an electronic paper have been created by an information processing terminal, such as a personal computer, and, together with a power supply, have been received and input at a communication terminal provided at the paper end. Therefore, contents displayed on the electronic paper are limited to text data previously input with the keys or image data previously drawn and created. Handwritten data, such as characters and pictures handwritten or drawn directly on the electronic paper, can be neither written nor displayed and held as on ordinary paper.

BRIEF SUMMARY OF THE INVENTION

In an electronic paper recording apparatus, an electronic paper is set on a paper mounting unit on which the electronic paper is mounted detachably. When the user operates on the display screen of the electronic paper, the user operation position on the display screen of the electronic paper is detected by an operation position detecting unit of the paper mounting unit. The data corresponding to the user operation position on the display screen of the detected electronic paper is transmitted to the electronic paper via mutual communication units and displayed by a nonvolatile display unit of the electronic paper. This causes the nonvolatile display unit to display the data corresponding to the user operation on the electronic paper, which enables the user to write data on the electronic paper, detach it from the paper mounting unit, and carry it with the user as if it were an ordinary sheet of paper.

According to the invention, it is possible to provide an electronic paper recording apparatus which enables data handwritten directly on the display surface to be written, displayed, and held in the same manner as using ordinary paper.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 12 is an electronic paper management table 54 stored and managed in an information storage unit 30 of the electronic pad 12B (12A) in the electronic paper recording apparatuses 10A, 10B of the first embodiment (part 1);

FIG. 13 shows electronic paper unique information 55 stored in an ID storage unit 20 of each electronic paper 11A (11B) in the electronic paper recording apparatuses 10A, 10B of the first embodiment (part 1);

FIG. 17 shows basic information stored in and managed at the virtual paper client 58*e* created at the server 53 when the electronic paper recording apparatus 10B of the first embodiment (part 1) has been used as a terminal of a thin client system;

FIG. 18 shows the contents of a user authentication table 62 stored in and managed at the client ID managing units 58*b* of the server units 53, 53W of the server client system in FIG. 15;

FIG. 19 shows the contents of an electronic paper authentication table 63 stored in and managed at the electronic paper ID managing units 58*d* of the server units 53, 53W of the server client system in FIG. 15;

FIG. 20 shows the contents of an electronic pen function table 64 stored in and managed at the information storage unit 30 of the electronic pads 12A, 12B in the electronic paper recording apparatuses 10A, 10B of the first embodiment (part 1);

DETAILED DESCRIPTION OF THE INVENTION

Hereinafter, referring to the accompanying drawings, embodiments of the invention will be explained.

First Embodiment

Figure 1:
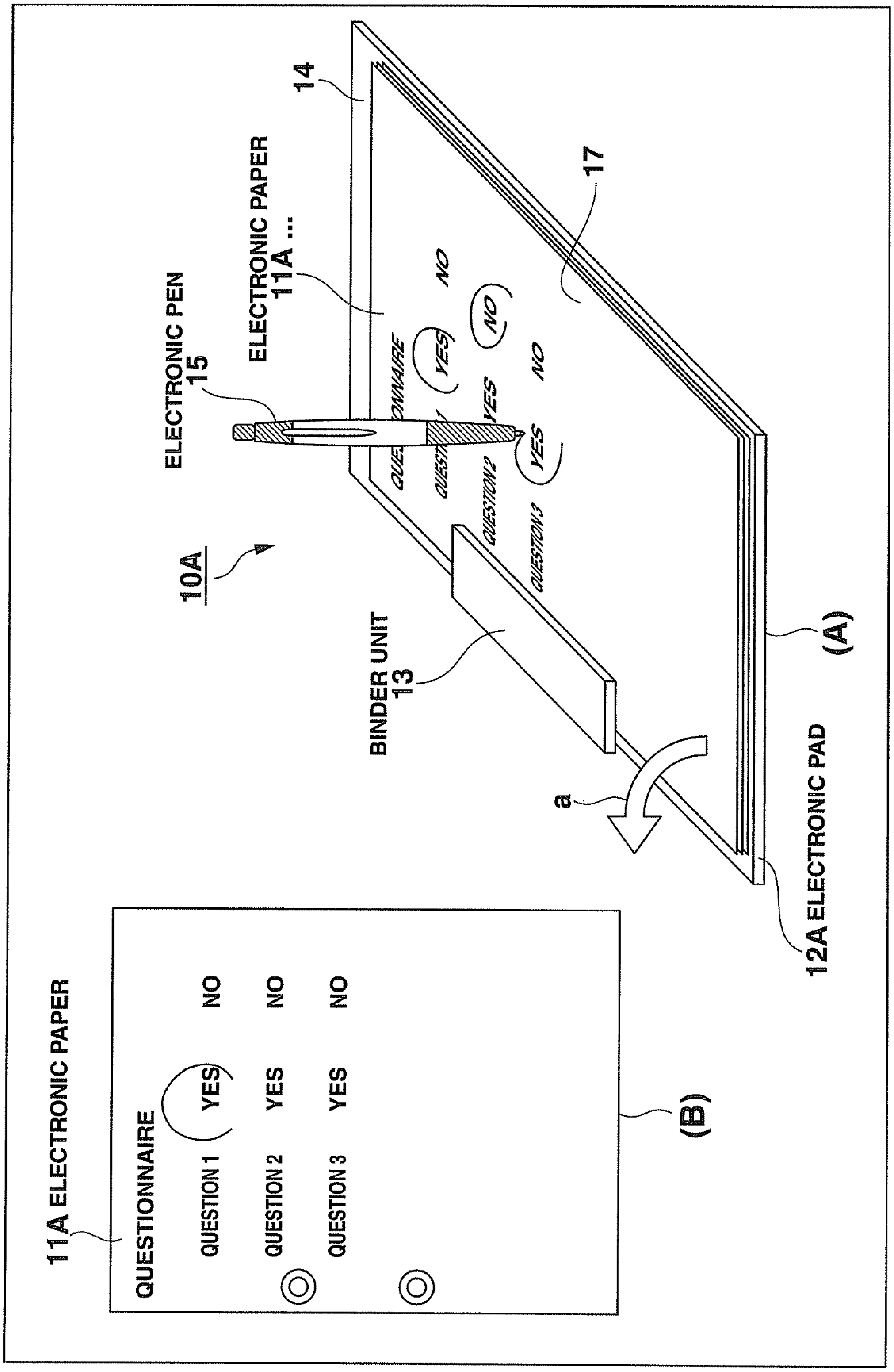
FIG. 1 shows a configuration of an electronic paper recording apparatus (single-sided type) 10A according to a first embodiment (part 1) of the invention, (A) being a perspective view of the electronic paper recording apparatus and (B) being a front view of a single electronic paper (single-sided type) 11A pulled out of the apparatus.

FIG. 1 shows a configuration of an electronic paper recording apparatus (single-sided type) 10A according to a first embodiment (part 1) of the invention, (A) being a perspective view of the electronic paper recording apparatus and (B) being a front view of a single electronic paper (single-sided type) 11A pulled out of the apparatus.

The electronic paper recording apparatus (single-sided type) 10A comprises a plurality of electronic papers (single-sided type) 11A each of which has a nonvolatile display unit 17 on its surface and an electronic pad (single-sided type) on which the plurality of electronic papers 11A are stacked one on top of another. The individual electronic papers 11A have the middle of their left side clipped and bound by a single-sided binder unit 13 provided in the middle of the left side of the electronic pad 12A.

The electronic pad 12A has, for example, an electromagnetic induction tablet 14 caused to correspond to the mounting face of the electronic paper 11A at the surface of the pad. With the tablet 14, the coordinate position corresponding to the handwriting position with an electronic pen 15 on the uppermost electronic paper 11A is detected. Then, a display storage unit built in the electronic paper 11A is caused to store display data corresponding to the detected coordinates of the handwriting position via a noncontact power supply unit and a communication unit (see FIGS. 3 to 6) provided using the binder unit 13. Then, a nonvolatile display unit 17 of the electronic paper 11A is caused to carry out a display operation.

The nonvolatile display unit 17 of the electronic paper 11A is such that, for example, black particles positively charged and white particles negatively charged are sealed alternately in a matrix between transparent electrode plates. A black display is achieved by charging one electrode plate negatively and a white display is achieved by charging one electrode plate positively. The electrode plate is charged with the polarity of the voltage last applied to the plate. The display is retained with no power supply.

This enables not only the display data externally input via the electronic pad 12A and its binder unit 13 to be displayed on the electronic paper 11A but also the handwritten data directly written with the electronic pen 15 to be displayed. Moreover, after removing the electronic paper 11A from the electronic pad 12A as shown by arrow a in (B) of FIG. 1, it can be treated as if it were an ordinary sheet of paper.

Figure 2:
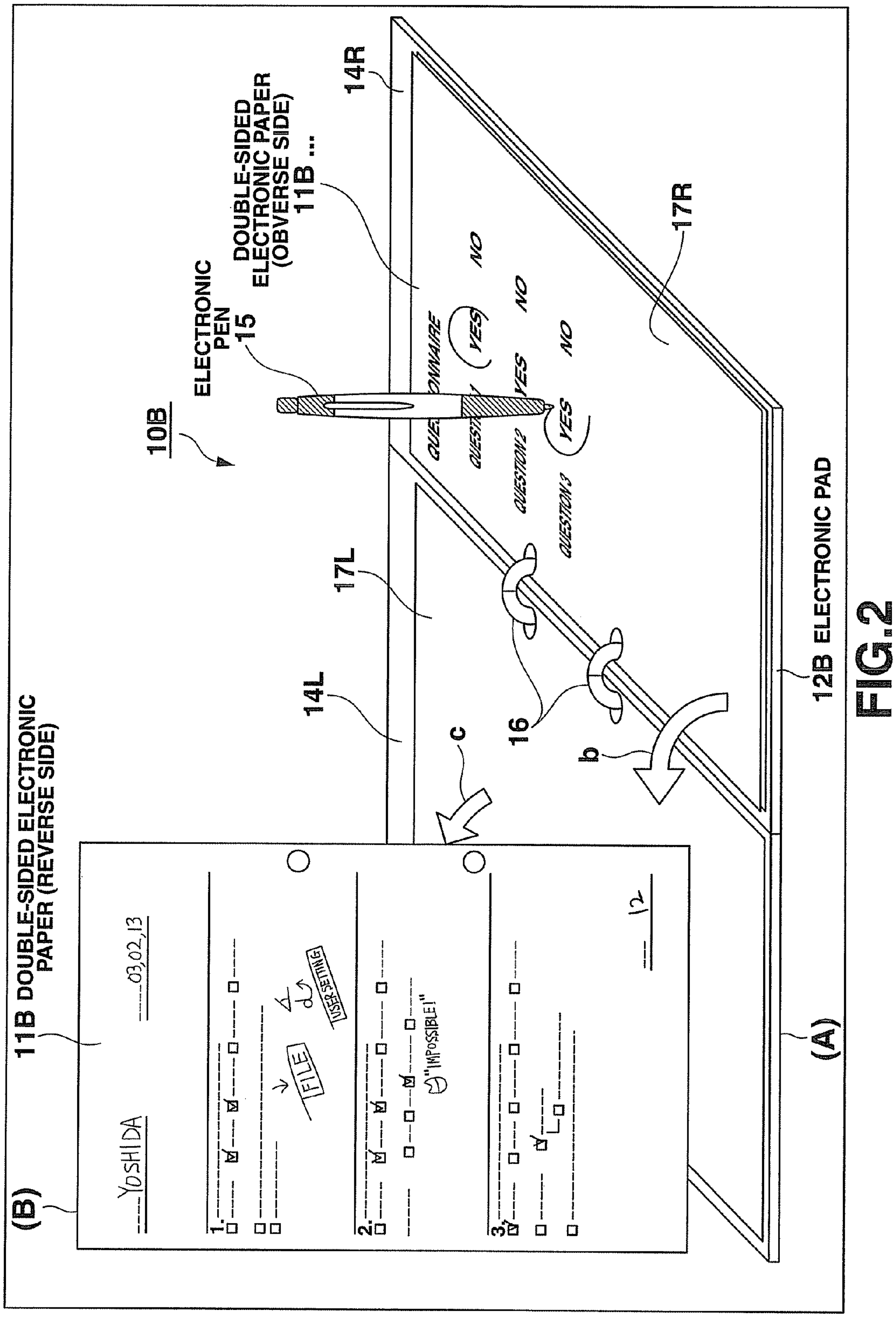
FIG. 2 shows a configuration of an electronic paper recording apparatus (double-sided type) 10B according to the first embodiment (part 1), (A) being a perspective view of the electronic paper recording apparatus and (B) being a front view of the backside of a single electronic paper (double-sided type) 11B pulled out of the apparatus.

FIG. 2 shows a configuration of an electronic paper recording apparatus (double-sided type) 10B according to the first embodiment (part 1), (A) being a perspective view of the electronic paper recording apparatus and (B) being a view of the backside of a single electronic paper (double-sided type) 11B pulled out of the apparatus.

Each of a plurality of electronic papers (double-sided type) 11B used in the electronic paper recording apparatus (double-sided type) 10B has nonvolatile display units 17R, 17L as described above on its obverse side and reverse side respectively. A two-page spread binder unit 16 provided in the middle of a two-page spread electronic pad 12B binds the plurality of electronic papers together in such manner that the binder unit 16 passes through one end part of each electronic paper.

The two-page spread electronic pad 12B has, for example, electromagnetic induction tablets 14R, 14L on the mounting face of the electronic paper 11B on each of the right and left parts of the two-page spread. Each of the tablets 14R and 14L detects the coordinate position corresponding to the handwriting position on the obverse side of the top right part of the electronic paper 11B and on the reverse side of the top left part of the electronic paper 11B with the electronic pen 15. Then, a display storage unit built in the electronic paper 11B is caused to store display data corresponding to the detected coordinates of the handwriting position on each of the obverse side and reverse side via a noncontact power supply unit and a communication unit (see FIGS. 3 to 6) provided so as to correspond to the two-page spread binder unit 16. Then, the nonvolatile display units 17R, 17L on both sides of the electronic paper 11B are caused to carry out a display operation.

This enables not only the display data externally input via the electronic pad 12B and its two-page spread binder unit 16 to be displayed on the obverse and reverse sides of the electronic paper (double-sided type) 11B but also the handwritten data directly written with the electronic pen 15 to be displayed. Moreover, if the electronic paper 11B is removed from the electronic pad 12B as shown by arrow c in (B) of FIG. 2, it can be treated as if it were an ordinary sheet of paper with an obverse side and reverse side.

Figure 3:
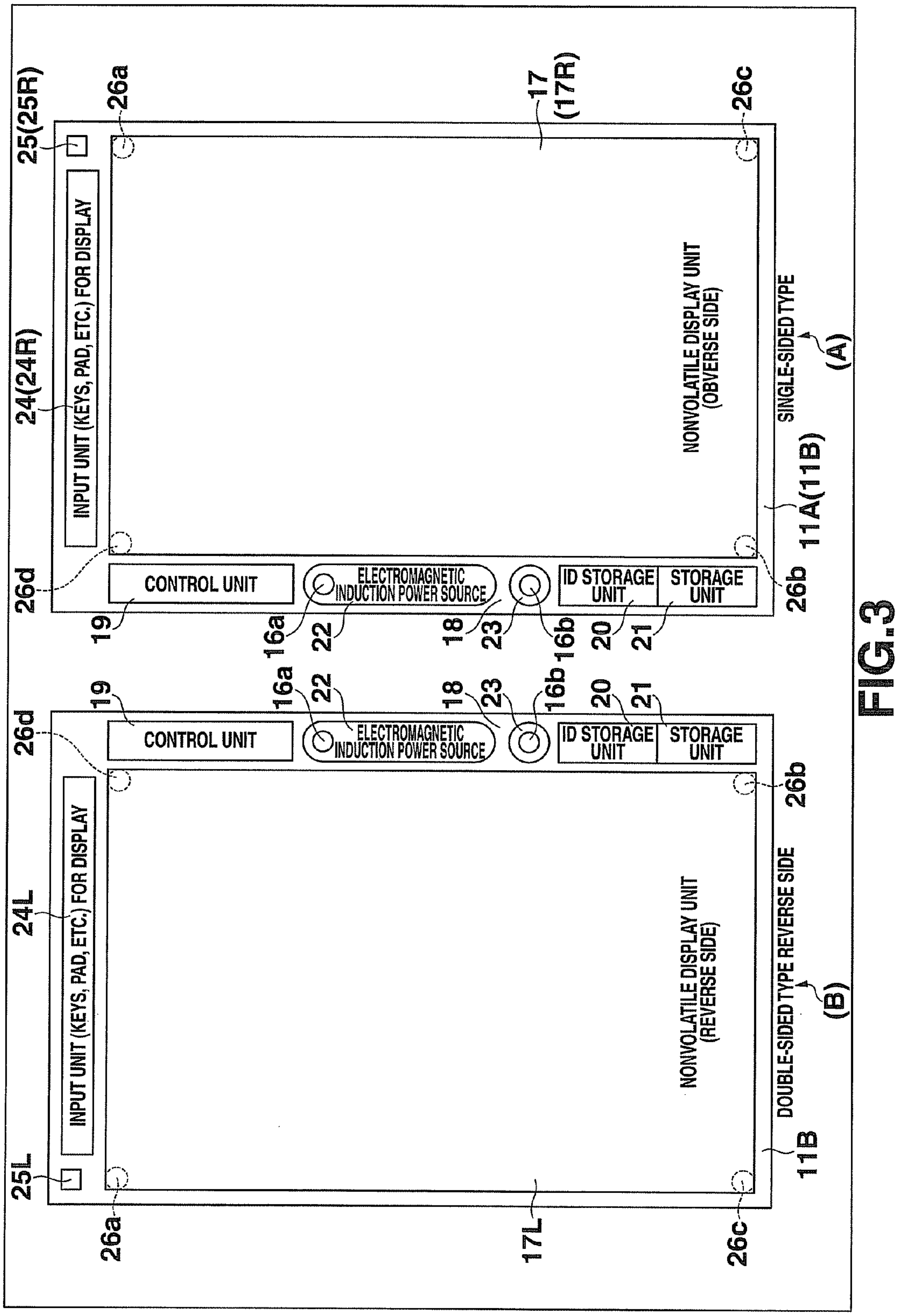
FIG. 3 shows a configuration of electronic papers 11A, 11B in the electronic paper recording apparatuses 10A, 10B according to the first embodiment (part 1), (A) being a configuration diagram of the electronic paper (single-sided type) 11A when viewed from the obverse side and (B) being a configuration diagram of the electronic paper (double-sided type) 11B when viewed from the reverse side.

FIG. 3 shows a configuration of the electronic papers 11A and 11B in the electronic paper recording apparatuses 10A, 10B according to the first embodiment (part 1), (A) being a configuration diagram of the electronic paper (single-sided type) 11A when viewed from the obverse side and (B) being a configuration diagram of the electronic paper (double-sided type) 11B when viewed from the reverse side.

The configuration of the electronic paper (single-sided type) 11A viewed from the obverse side is the same as that of the electronic paper (double-sided type) 11B.

Nonvolatile display units (obverse side) 17 (17R) and (reverse side) 17L are provided in almost all the areas in the middle of the electronic papers 11A, 11B, respectively. Moreover, a bind-in unit 18 houses a control unit 19 composed of a flexible IC chip, an ID storage unit 20 for storing separate electronic paper IDs, and a (information) storage unit 21 for storing display data in such a manner that they are common to the obverse and reverse sides of the electronic paper.

Furthermore, a noncontact electromagnetic induction power source unit 22 is built into the surrounding area of one binder through-hole 16*a* made in the middle of the bind-in unit 18 in such a manner that the power source unit 22 is common to both the obverse side and reverse side. Moreover, a noncontact communication unit 23 is built into the surrounding area of the other binder through-hole 16*b* in such a manner that the communication unit 23 is common to both the obverse side and reverse side.

Furthermore, input units 24 (24R), 24L using keys or a touch pad are provided in the upper part of the obverse side of the electronic papers 11A, 11B and in the upper part of the reverse side of the electronic paper 11B. Overlap sensors 25 (25R), 25L using photo-detectors are provided at the end of the upper part of the paper opposite to the bind-in unit 18.

Then, calibration pointers 26*a* to 26*d* (see FIG. 8) for detecting the displacement of the mounting position of the electronic papers 11A, 11B with respect to the electronic pad tablets 14 (14R), 14L are built into the four corners of the nonvolatile display units (obverse side) 17 (17R), (reverse side) 17L of the electronic papers 11A, 11B in such a manner that the pointers 26*a* to 26*d* are common to both the obverse side and reverse side of the electronic paper.

Figure 4:
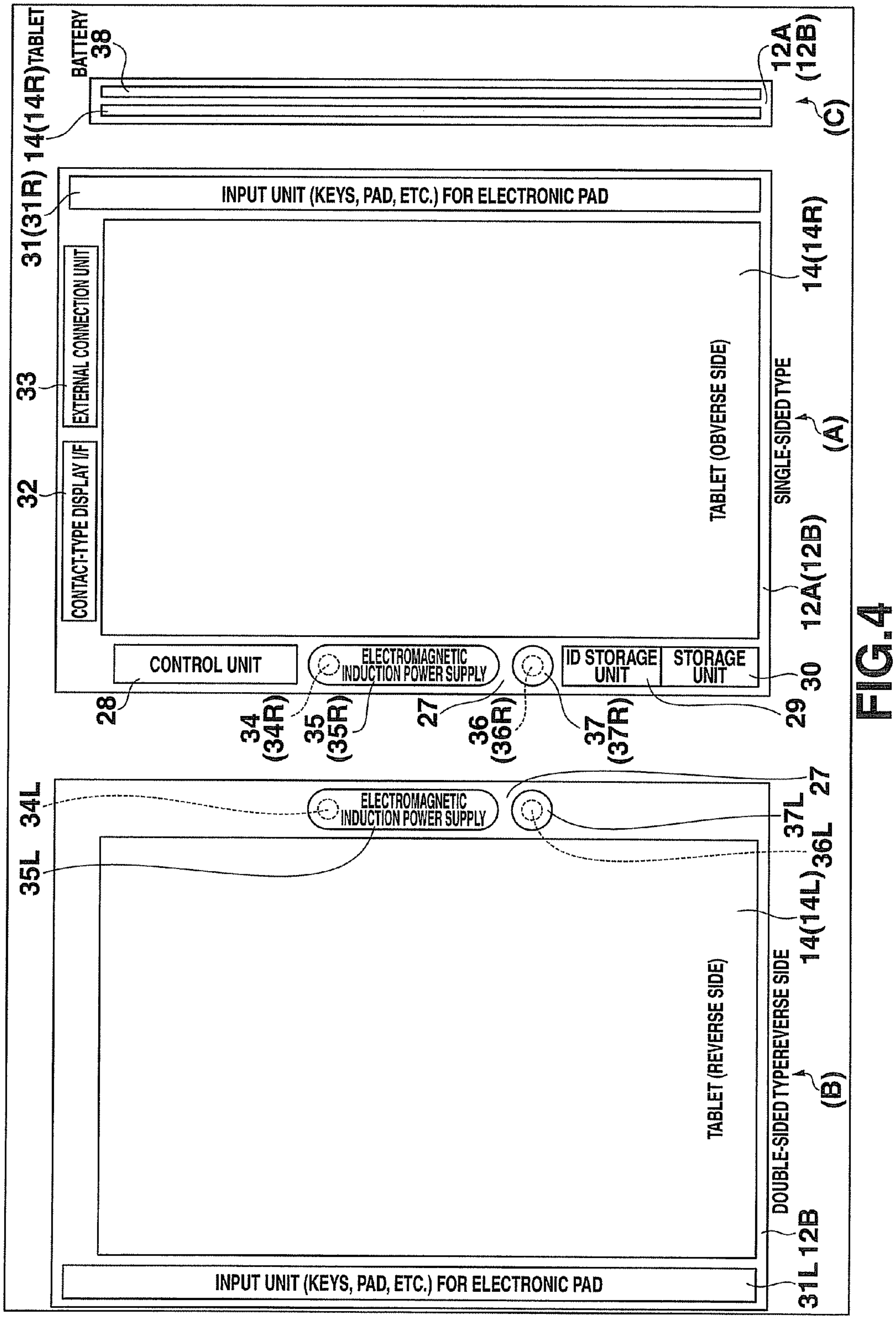
FIG. 4 shows a configuration of electronic pads 12A, 12B in the electronic paper recording apparatuses 10A, 10B according to the first embodiment (part 1), (A) being a configuration diagram of the electronic pad (single-sided type) 12A when viewed from the front side, (B) being a configuration diagram of the left side of the two-page spread electronic pad 12B, and (C) being a vertical cross-sectional view of (the right side of) the electronic pads 12A, 12B.

FIG. 4 shows a configuration of electronic pads 12A, 12B in the electronic paper recording apparatuses 10A, 10B according to the first embodiment (part 1), (A) being a configuration diagram of the electronic pad (single-sided type) 12A when viewed from the front side, (B) being a configuration diagram of the left side of the two-page spread electronic pad 12B, and (C) being a vertical cross-sectional view of (the right side of) the electronic pads 12A, 12B.

The configuration of the electronic pad (single-sided type) 12A viewed from the front is the same as that of the two-page spread electronic pad 12B when viewed from the right side.

Tablets 14 (14R), 14L of, for example, an electromagnetic induction type are provided in almost all the areas in the middle of the electronic pads 12A, 12B. Moreover, a paper bind-in unit 27 houses a control unit 28 composed of an IC chip, an ID storage unit 29 for storing separate electronic pad IDs, and a (information) storage unit 30 for storing display data for the electronic papers 11A, 11B.

Furthermore, pad input units 31 (31R), 31L using keys or a touch pad are provided at the right end of the electronic pads 12A, 12B and at the left end of the electronic pad 12B, respectively. Moreover, at the top end, there are provided a contact-type display I/F (interface) 32 for enabling connector connection of a display unit always needing power supply, such as an LCD monitor, and an external connection unit 33 for connecting with an external communication network or a server computer on the communication network.

Furthermore, electromagnetic induction power supply units 35 (35R), 35L are built into the central part of the paper bind-in unit 27 caused to correspond to the binder position. There are provided power supply cores 34 (34R), 34L for achieving noncontact power supply to the electronic papers 11A, 11B by electromagnetic induction from the electromagnetic induction power supply units 35 (35R), 35L.

In addition, communication units 37 (37R), 37L are built in the central part of the paper bind-in unit 27 caused to correspond to the binder position. There are provided communication cores 36 (36R), 36L for achieving noncontact communication with the electronic papers 11A, 11B by electromagnetic induction from the communication units 37 (37R), 37L.

The electronic pads 12A, 12B have, for example, a rechargeable battery 38 built-in. The battery 38 supplies electric power to the tablets 14 (14R), 14L, control unit 28, ID storage unit 29, storage unit 30, pad input units 31 (31R), 31L, and external display unit (see FIG. 10) connected via the contact-type display I/F 32. At the same time, the electromagnetic induction power supply units 35 (35R), 35L supply electric power via the power supply cores 34 (34R), 34L to the electronic papers 11A, 11B placed on the electronic pads 12A, 12B in a noncontact manner.

Figure 5:
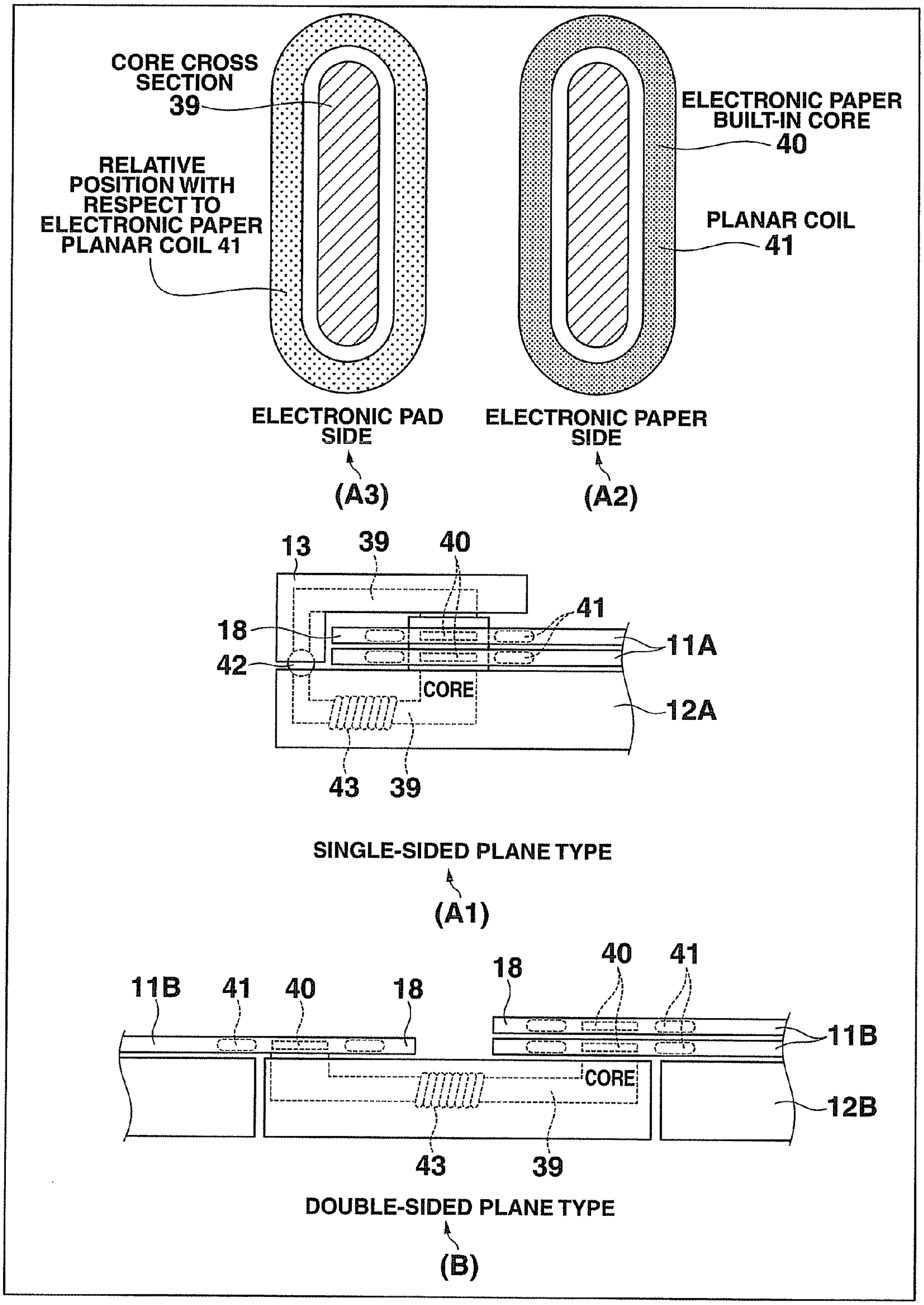
FIG. 5 shows a configuration of an electromagnetic induction unit (flat type) for supplying electric power to and making a communication connection with electronic papers 11A, 11B provided so as to correspond to the binder units 13, 16 of the electronic pads 12A, 12B in the electronic paper recording apparatuses 10A, 10B of the first embodiment (part 1)

FIG. 5 shows a configuration of an electromagnetic induction unit (flat type) for supplying electric power to and making a communication connection with the electronic papers 11A, 11B provided so as to correspond to the binder units 13, 16 of the electronic pads 12A, 12B in the electronic paper recording apparatuses 10A, 10B of the first embodiment (part 1).

The electromagnetic induction unit (flat type) supplies electric power to and makes a communication connection with the electromagnetic induction power source unit 22 and communication unit 23 of the bind-in unit 18 of each of the electronic papers 11A, 11B which has neither the binder through-hole 16*a* nor 16*b* (see FIG. 3). In both of the electronic papers (single-sided type) 11A and (double-sided type) 11B, an in-paper core 40 is built in a position corresponding to the exposed tip face of a pad-side core 39 provided to the electromagnetic induction power supply units 35 (35R), 35L and communication units 37 (37R), 37L of the electronic pads 12A, 12B. Then, a signal drawing planar coil 41 is built in so as to surround the in-paper core 40.

In the case of the electromagnetic induction unit of the electronic pad (single-sided type) 12A shown in (A1) of FIG. 5, the pad-side core 39 is extended into the inside of the binder unit 13 which interfiles the electronic paper (single-sided type) 11A so as to combine with the in-paper core 40 of the electronic paper (single-sided type) 11A so that the flux loop of magnetic lines may be formed with low loss. In (A1) of FIG. 5, numeral 42 indicates a hinge which has binding force in the binder unit 13.

Figure 7:
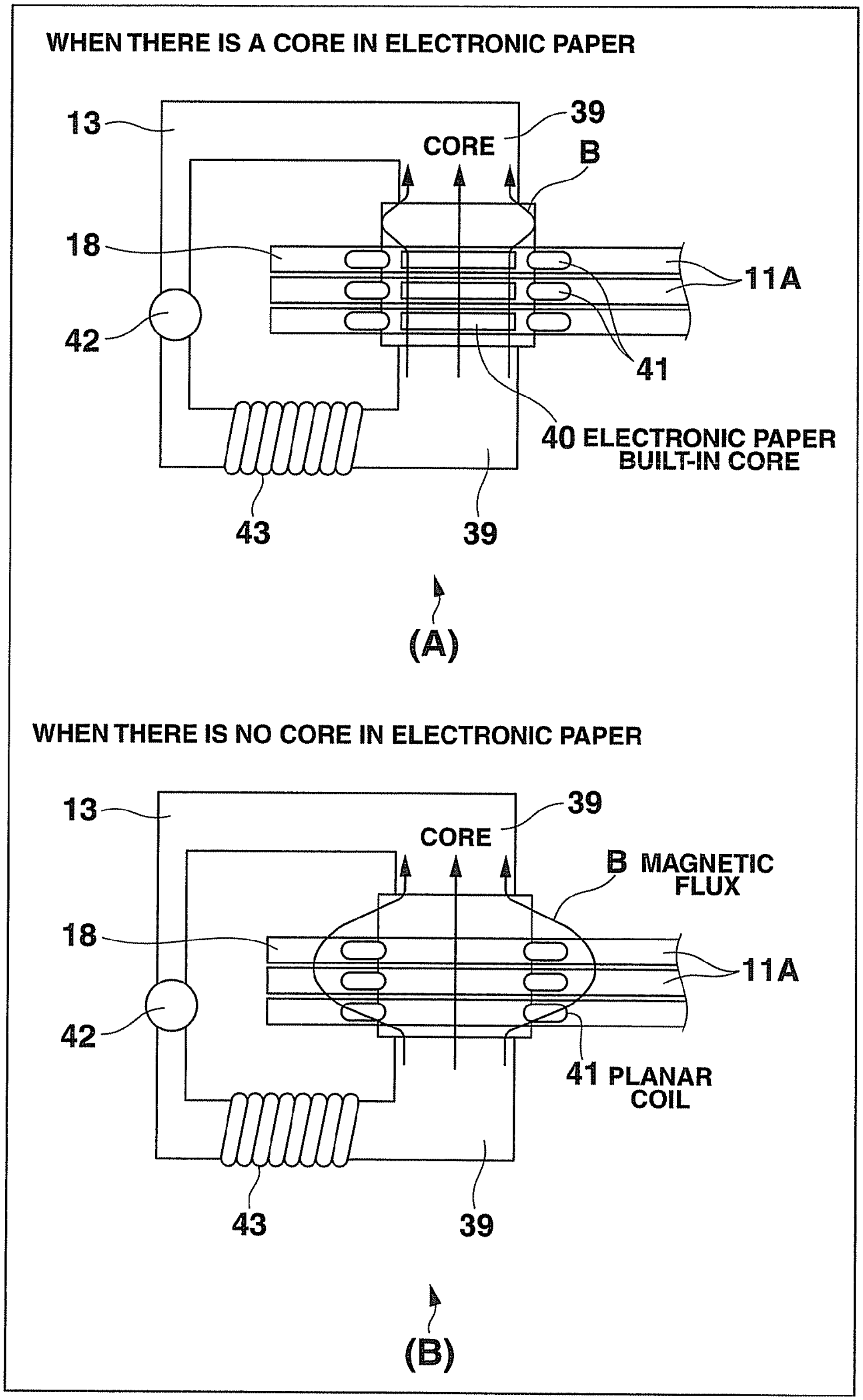
FIG. 7 shows the way a magnetic flux loop B is formed when an in-paper core 40 is provided in a bind-in unit 18 of the electronic paper (single-sided type) 11A in the electronic paper recording apparatuses 10A, 10B of the first embodiment (part 1) in comparison with when the in-paper core 40 is not provided in the bind-in unit.

FIG. 7 shows the way a magnetic flux loop B is formed when the in-paper core 40 is provided in the bind-in unit 18 of the electronic paper (single-sided type) 11A in the electromagnetic induction unit of the electronic paper recording apparatuses 10A, 10B of the first embodiment (part 1) in comparison with when the in-paper core 40 is not provided in the bind-in unit.

Specifically, as shown in (A) of FIG. 7, when the in-paper core 40 is provided in the bind-in unit 18 of the electronic paper (single-sided type) 11A, the magnetic resistance between the paper and the pad-side core 39 becomes lower via the in-paper core 40 than when the in-paper core is not provided, as shown in (B) of FIG. 7, reducing the leakage flux, which allows the flux loop B to pass through smoothly and be formed. The power supply energy signals output from the electromagnetic induction power supply units 35 (35R), 35L of the electronic pads 12A, 12B and the communication signals transmitted from the communication units 37 (37R), 37L pass through the pad-side coil 43 and pad-side core 39 and are transmitted efficiently from the in-paper core 40 of the electronic papers 11A, 11B to the paper-side planar coil 41. Then, electric power is supplied to the electromagnetic induction power source unit 22. The signal is received by the communication unit 23.

Figure 6:
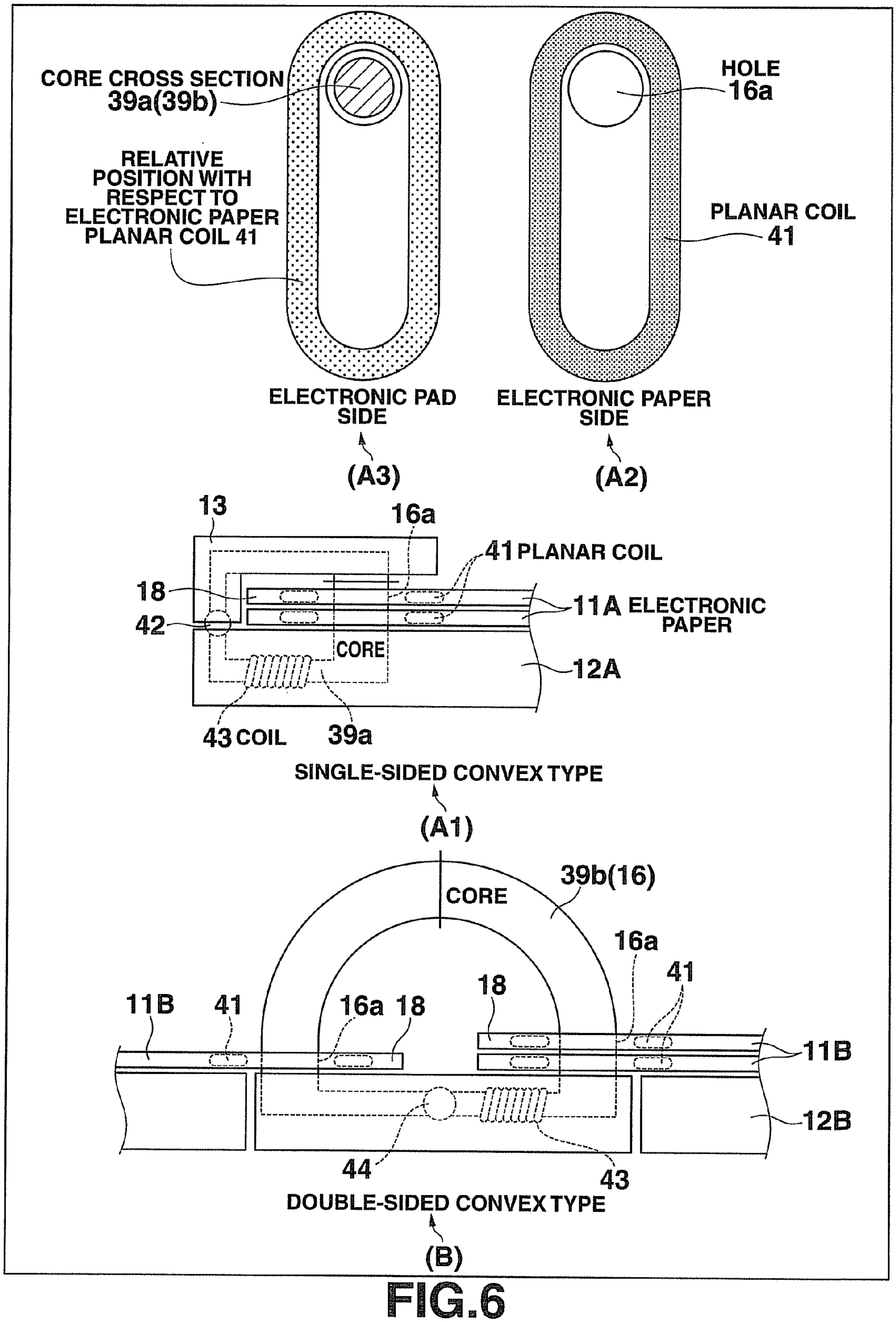
FIG. 6 shows a configuration of an electromagnetic induction unit (convex type) for supplying electric power to and making a communication connection with electronic papers 11A, 11B provided so as to correspond to the binder units 13, 16 of the electronic pads 12A, 12B in the electronic paper recording apparatuses 10A, 10B of the first embodiment (part 1)

FIG. 6 shows a configuration of an electromagnetic induction unit (convex type) for supplying electric power to and making a communication connection with electronic papers 11A, 11B provided so as to correspond to the binder units 13, 16 of the electronic pads 12A, 12B in the electronic paper recording apparatuses 10A, 10B of the first embodiment (part 1).

The electromagnetic induction unit (convex type) supplies electric power to and makes a communication connection with the electromagnetic induction power source unit 22 and communication unit 23 of the bind-in unit 18 in the electronic papers 11A, 11B which has binder through-holes 16*a*, 16*b* (see FIG. 3). As shown in (A1) of FIG. 6, in the case of the electronic paper (single-sided type) 11A, a binder convex core 39*a* provided so as to correspond to the electromagnetic induction power supply unit 35 and communication unit 37 of the electronic pad (single-sided type) 12A is inserted into and locked in the binder through-holes 16*a*, 16*b* in the bind-in unit 18 of the electronic paper (single-sided type) 11A, thereby interfiling the electronic paper (single-sided type) 11A.

As shown in (B) of FIG. 6, in the case of the electronic paper (double-sided type) 11B, a binder convex ring core 39*b* (16) provided so as to correspond to the electromagnetic induction power supply unit 35 and communication unit 37 of the electronic pad (double-sided type) 12B is inserted into and locked in the binder through-holes 16*a*, 16*b* in the bind-in unit 18 of the electronic paper (double-sided type) 11B, thereby interfiling the electronic paper (double-sided type) 11B. In (B) of FIG. 6, numeral 44 indicates a hinge which has binding force in the binder unit 16 (39*b*).

In the case of the electromagnetic induction units of the electronic pads 12A, 12B for the electronic papers 11A, 11B having the binder through-holes 16*a*, 16*b* shown in FIG. 6, since a toroidal core passing through the binder through-holes 16*a*, 16*b* of the electronic papers 11A, 11B is formed by either the binder convex core 39*a* or binder convex ring core 39*b* in both one electronic pad (single-sided type) 12A and the other electronic pad (double-sided type) 12B, the flux loop of magnetic lines is formed with lower loss.

Specifically, the power supply energy signals output from the electromagnetic induction power supply units 35 (35R), 35L of the electronic pads 12A, 12B and the communication signals transmitted from the communication units 37 (37R), 37L pass through the pad-side coil 43 and binder convex core 39*a* or binder convex ring core 39*b* and are transmitted efficiently from the paper-side planar coils 41 of the electronic papers 11A, 11B. Then, electric power is supplied to the electromagnetic induction power source unit 22. The signal is received by the communication unit 23.

Figure 8:
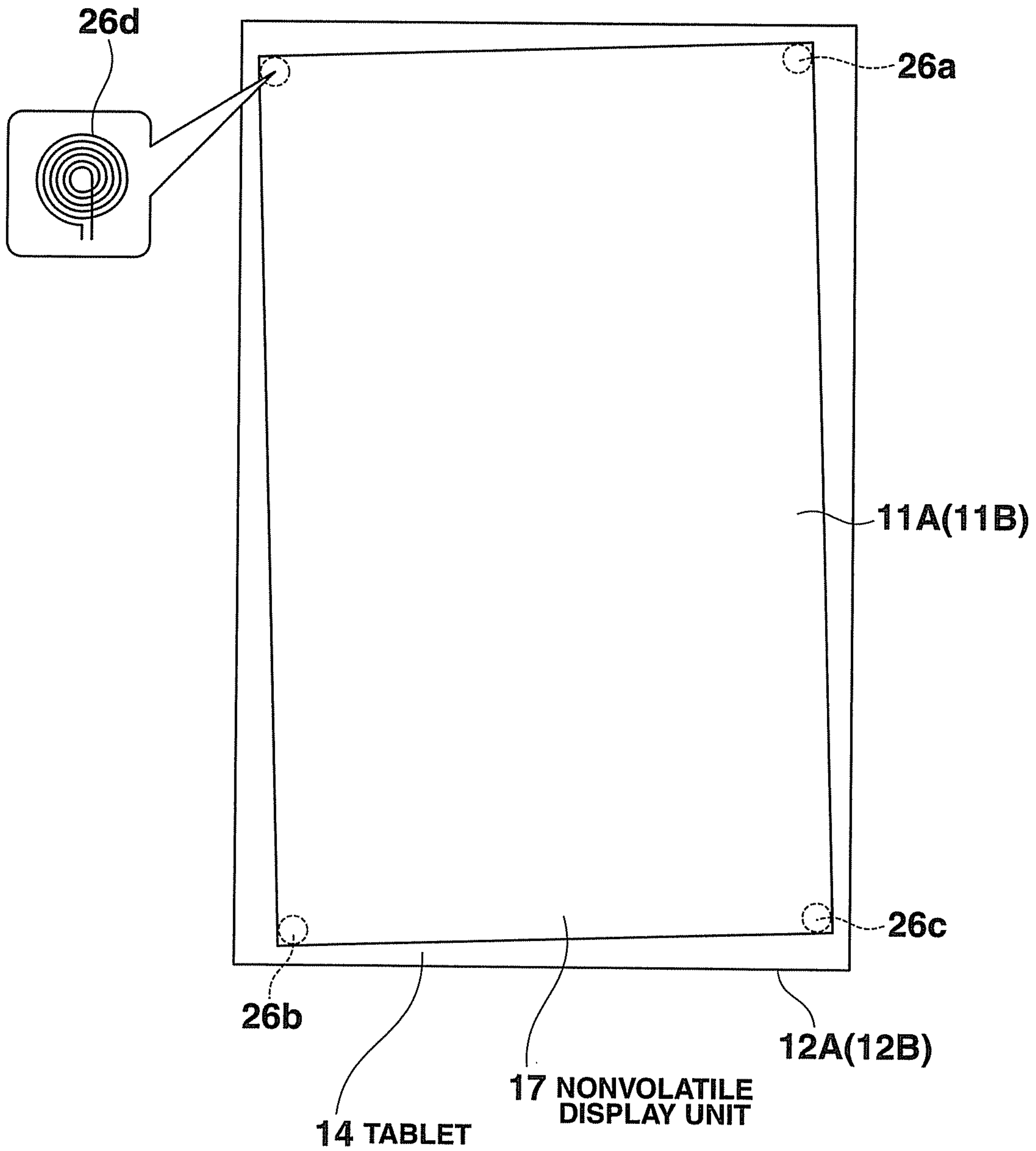
FIG. 8 shows the positional relationship between calibration pointers 26*a* to 26*d* of the electronic paper 11A (11B) and the tablet 14 of the electronic pad 12A (12B) in the electronic paper recording apparatuses 10A, 10B of the first embodiment (part 1)

FIG. 8 shows the positional relationship between calibration pointers 26*a* to 26*d* of the electronic paper 11A (11B) and the tablet 14 of the electronic pad 12A (12B) in the electronic paper recording apparatuses 10A, 10B of the first embodiment (part 1).

When handwriting is done with the electronic pen 15 on the electronic paper 11A (11B) placed on the tablet 14 of the electronic pad 12A (12B), the coordinates of the writing position with the electronic pen 15 are detected by the tablet 14 of the electronic pad 12A (12B).

At this time, the deviation of the coordinates of the mounting position of the electronic paper 11A (11B) from those of its determined mounting position is calculated and detected by the control unit 28 of the electronic pad 12A (12B) by detecting the coordinates of the position of each of the calibration pointers 26*a* to 26*d* composed of electromagnetic induction coils with the tablet 14.

By doing this, the coordinate position detected by the tablet 14 of the electronic pad 12A (12B) as a result of writing work with the electronic pen 15 on the electronic paper 11A (11B) is corrected according to the detected amount of deviation from the determined mounting position on the electronic paper 11A (11B). According to the corrected writing coordinate position, display data on a writing locus is stored from the communication unit 23 of the electronic paper 11A (11B) into the (information) storage unit 21. Then, the handwriting data is displayed on the nonvolatile display unit 17.

Figure 9:
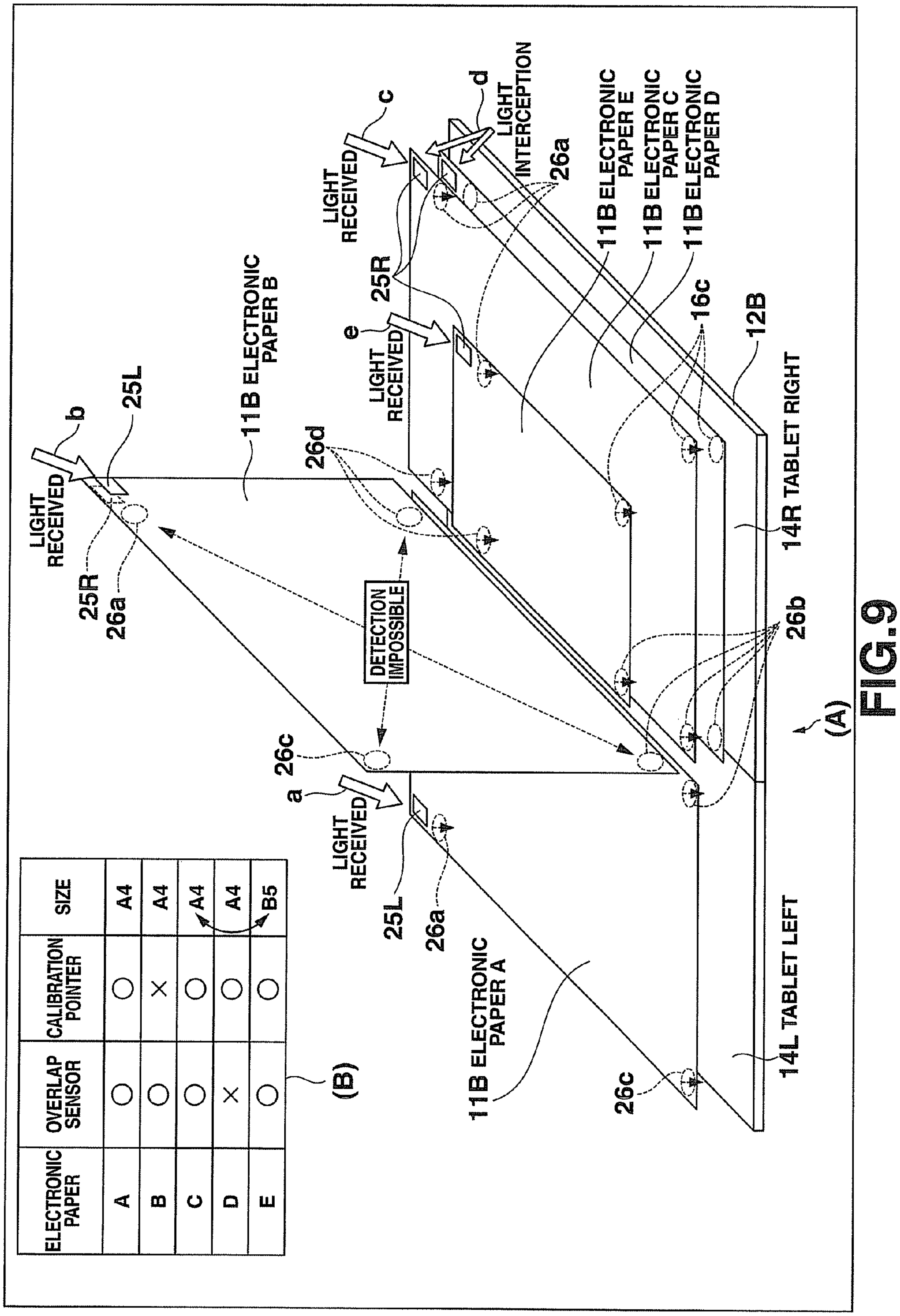
FIG. 9 is a diagram to help explain the function of distinguishing a valid electronic paper when a plurality of electronic papers (double-sided type) 11B (A to E) including those of different sizes (double-sided type) are bound into the electronic pad (double-sided type) 12B of the electronic paper recording apparatus (double-sided type) 10B, (A) showing a plurality of electronic papers (double-sided type) 11B (A to E) opened and closed with respect to the electronic pad (double-sided type) 12B and (B) showing a valid electronic paper determining unit.

FIG. 9 is a diagram to help explain the function of distinguishing a valid electronic paper when a plurality of electronic papers including those of different sizes (double-sided type) 11B (A to E) are bound into the electronic pad (double-sided type) 12B of the electronic paper recording apparatus (double-sided type) 10B, (A) showing a plurality of electronic papers (double-sided type) 11B (A to E) opened and closed with respect to the electronic pad (double-sided type) 12B and (B) showing a valid electronic paper determination table.

For example, in a state where a single electronic paper 11B (A) is opened on the left tablet 14L of the electronic pad (double-sided type) 12B, three electronic papers 11B are laid one on top of another in the order of (D)→(C)→(E) on the right tablet 14R, and further the electronic paper 11B (B) stands straight almost in the middle of the electronic pad (double-sided type) 12B, a backside overlap sensor 25L of the electronic paper 11B (A) on the left tablet 14L detects received light a and determines that "there is no overlap" and, at the same time, the coordinate position of the electronic paper is detected on the tablet 14L according to the calibration pointers 26*a* to 26*d*. Therefore, it is determined that the electronic paper 11B (A) is valid (or active) on the left face of the electronic pad (double-sided type) 12B.

Furthermore, the obverse and reverse side overlap sensors 25R and 25L of the electronic paper 11B (B) standing straight detect received light b and determine that "there is no overlap" and, at the same time, the electromagnetic induction signals from the calibration pointers 26*a* to 26*d* are detected at neither the right tablet 14R nor left tablet 14L of the electronic pad 12B. Therefore, it is determined that the electronic paper 11B (B) is invalid (or inactive).

Moreover, as for the three electronic papers 11B (D) (C) (E) laid one on top of another on the right tablet 14R, any of the electronic papers 11B (D) (C) (E) is detected by the tablet 14R according to the calibration pointers 26*a* to 26*d*. At the same time, the obverse-side overlap sensor 25R of each of the electronic papers 11B (C) (D) detects received light c, e and it is determined that "there is no overlap." The electronic papers 11B (E) of a smaller paper size are given priority and determined to be valid (or active) on the right face of the electronic pad (double-sided type) 12B.

Accordingly, in the control unit 28 of the electronic pad 12B, the detection of the presence or absence of an overlap by the obverse and reverse side overlap sensors 25R, 25L, the detection of the presence or absence of activation by the calibration pointers 26*a* to 26*d*, each paper size, and others are acquired and managed in such manner that they are caused to correspond to the IDs of the individual electronic papers 11B (A to E) making communication contact in a noncontact manner via the electromagnetic induction unit. This enables the control unit 28 of the electronic pad 12B to distinguish the valid (active) electronic paper 11B on the right and left tablets 14R, 14L and further enables the handwritten data with the electronic pen 15 detected by the right and left tablets 14R, 14L to be displayed on the nonvolatile display units 17R, 17L which have the ID of the valid (active) electronic paper 11B via the electromagnetic induction unit.

Figure 10:
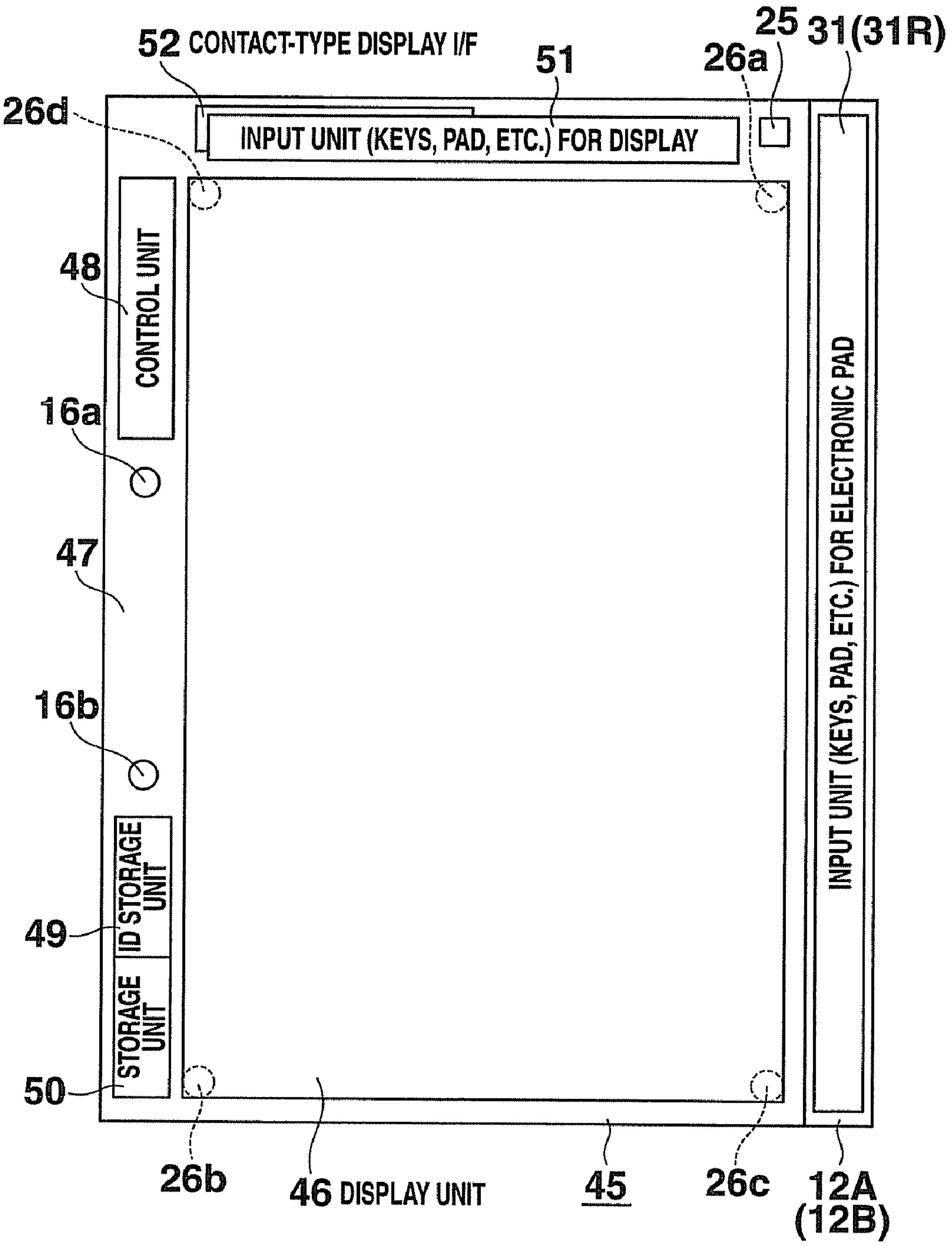
FIG. 10 is a front view of a display unit 45 which is bound in the electronic pads 12A, 12B and connected to a contact-type display I/F (interface) 32 of the electronic pads for use in the electronic paper recording apparatuses 10A, 10B of the first embodiment (part 1)

FIG. 10 is a front view of a display unit 45 which is bound in the electronic pads 12A, 12B and connected to a contact-type display I/F (interface) 32 of the electronic pads for use in the electronic paper recording apparatuses 10A, 10B of the first embodiment (part 1).

The display unit 45 has, in almost all its central area, an LCD display unit 46 which always requires power supply when in operation. Calibration pointers 26*a* to 26*d* which have the same configuration and function as those of the electronic papers 11A, 11B are built into positions corresponding to the four corners of the LCD display unit 46.

Furthermore, binder through-holes 16*a*, 16*b* are made in the bind-in unit 47 for mounting on the electronic pads 12A, 12B. In addition, a control unit 48 composed of an IC chip, an ID storage unit 49 for storing separate display unit IDs, and a (information) storage unit 50 for storing display data are built into the bind-in unit 47.

Moreover, in the upper part of the display unit 45, there is provided an input unit 51 using keys or a touch pad. At the end of the upper part of the unit opposite to the bind-in unit 47, there is provided an overlap sensor 25 which has the same configuration and function as described above.

On the reverse side of the upper part of the unit, there is provided a contact-type display I/F 52 which makes a connector connection with the contact display I/F 32 in the upper part of the obverse side of the electronic pads 12A, 12B in order to receive power supply and display data input.

Figure 11:
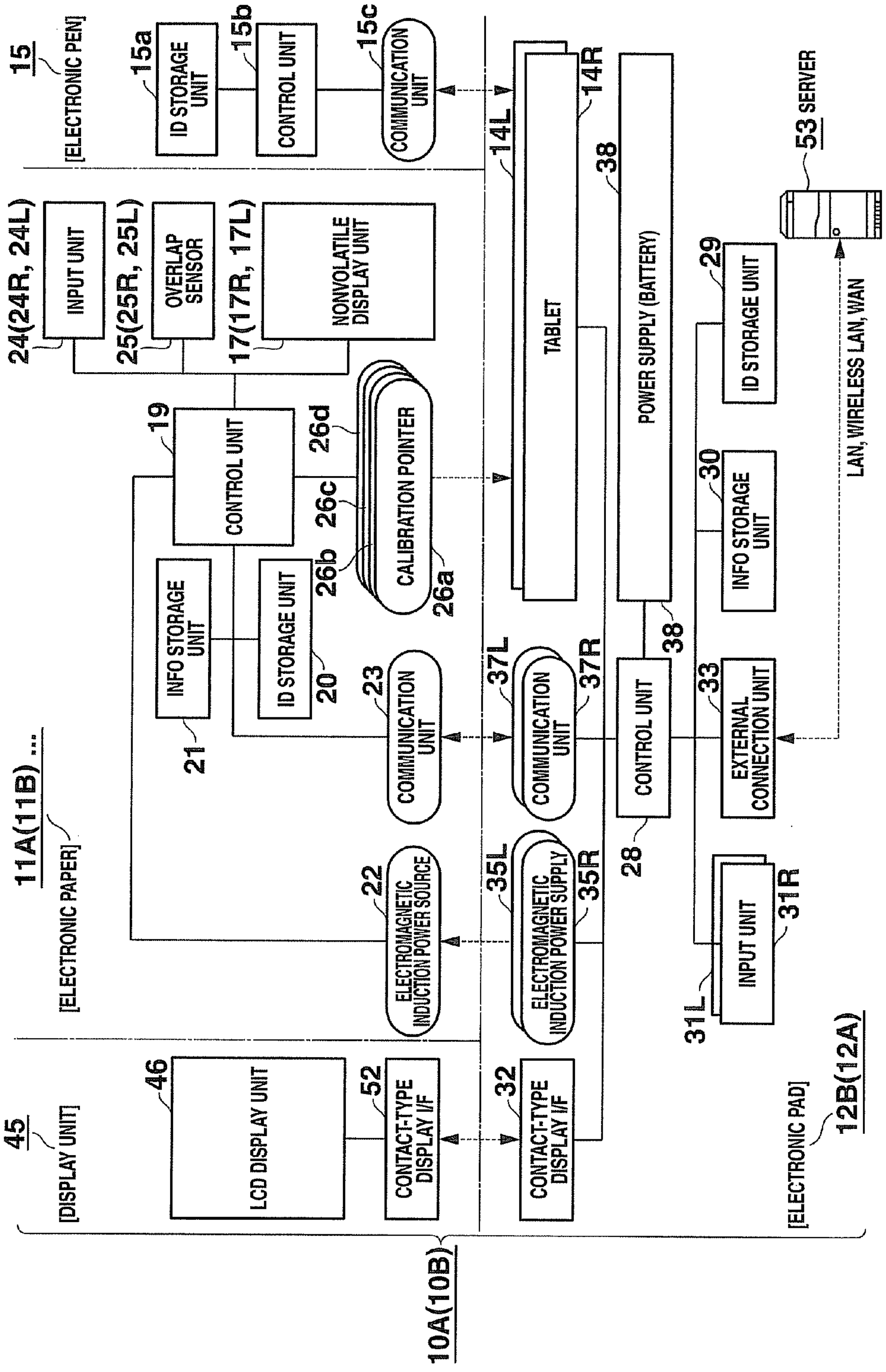
FIG. 11 is a block diagram of an electronic circuit when the electronic paper recording apparatuses 10A, 10B of the first embodiment (part 1) are incorporated as terminals into a thin client (server-based computing) system.

FIG. 11 is a block diagram of an electronic circuit when the electronic paper recording apparatuses 10A, 10B of the first embodiment (part 1) are incorporated as terminals into a thin client (server-based computing) system.

The thin client system is such that the function on the terminal side is limited only to an operation input and a display output and all of the processes, data creation, and data storage according to the terminal operation input are carried out on the side of server unit 53, thereby assuring the security of data protection without a high-tech terminal.

As described in FIG. 3, the electronic circuit of the electronic paper 11A (11B) is such that the nonvolatile display unit 17 (17R, 17L), ID storage unit 20, information storage unit 21, electromagnetic induction power source unit 22, communication unit 23, input unit 24 (24R, 24L), overlap sensor 25 (25R, 25L), and calibration pointers 26*a* to 26*d* are connected, centering around the control unit 19 composed of a low-tech CPU, such as a flexible IC-chip computer.

As described in FIG. 4, the electronic circuit of the electronic pad 12B (12A) is such that the tablets 14R, 14L (14), ID storage unit 29, information storage unit 30, input units 31R, 31L (31), contact-type display I/F 32, external connection unit 33, electromagnetic induction power supply units 35R, 35L (35), communication units 37R, 37L (37), power supply unit (battery) 38 are connected, centering around the control unit 28 composed of a low-tech CPU, such as a flexible IC-chip computer.

As shown in FIGS. 1 and 2, the electronic paper 11A (11B) is placed on the tablets 14R, 14L (14) and bound in the electronic pad 12B (12A) by the binder unit 16 (13), causing the electromagnetic induction power supply units 35R, 35L (35) of the electronic pad 12B (12A) to be connected electromagnetically to the electromagnetic induction power source unit 22 of the electronic paper 11A (11B) via the electromagnetic induction unit as shown in FIG. 5 or 6. Moreover, the communication units 37R, 37L (37) of the electronic paper 12B (12A) are connected electromagnetically to the communication unit 23 of the electronic paper 11A (11B).

Then, the coordinates of the electromagnetic induction signals generated from the calibration pointers 26*a* to 26*d* of the electronic paper 11A (11B) are detected by the tablets 14R, 14L (14) of the electronic pad 12B (12A), thereby detecting the mounting position of the electronic paper 11A (11B) on the tablets 14R, 14L (14).

The electronic pen 15 includes an ID storage unit 15*a* which stores the pen ID, an IC chip control unit 15B which reads the pen ID stored in the ID storage unit 15*a* and generates and outputs an code signal, and a communication unit 15*c* which has a coil that converts the code signal of the pen ID generated and output from the control unit 15*b* into an electromagnetic induction signal and outputs the converted signal.

Program data used for the control unit 19 to control each circuit section of the electronic paper 11A (11B) is stored in the information storage unit 21. The information storage unit 21 stores not only unique information (see FIG. 13) on the specification of the electronic paper 11A (11B) but also key operation input data from the input unit 24 (24R, 24L), handwriting position detection input data on the electronic pad 12B (12A) from the electronic pen 15, text and image input data from the externally connected server unit 53, and display data to be displayed on the nonvolatile display unit 17 (17R, 17L).

Program data for the control unit 28 to control each circuit section of the electronic paper 12B (12A) is stored in the information storage unit 30. Moreover, the information storage unit 30 temporarily stores not only management information (see FIG. 12) for managing each electronic paper 11A (11B) now bound in but also key operation input data from the input units 31R, 31L (31), handwriting position detection input data on the tablets 14R, 14L (14) from the input units 31R, 31L (31), text and image input data from the externally connected server unit 53, and display data to be transmitted to and displayed on the presently valid (active) electronic paper 11A (11B).

Then, as described in FIG. 10, the display unit 45 is bound in the binder unit 16 (13) of the electronic pad 12B (12A) as needed in the same manner as the electronic paper 11A (11B). The display unit is connected by the respective contact-type display I/F 32, 52. In the display unit 45, too, handwriting position detection input data on the electronic pad 12B (12A) from the electronic pen 15 or text and image input data from the externally connected server unit 53 can be displayed on the LCD display unit 46.

FIG. 12 is an electronic paper management table 54 stored and managed in the information storage unit 30 of the electronic pad 12B (12A) in the electronic paper recording apparatuses 10A, 10B of the first embodiment (part 1).

The electronic paper management table 54 is composed of unique information (electronic paper ID: ID, obverse and reverse side code, size) on each electronic paper 11A (11B) received in communication from each electronic paper 11A (11B) bound by the binder unit 16 (13) of the electronic pad 12B (12A) and placed on the tablets 14R, 14L, overlap detection information from the overlap sensor 25 (25R, 25L), correction information for the handwriting position recognized when the coordinates of the positions of the calibration pointers 26*a* to 26*d* of each electronic paper 11A (11B) are detected by the tablets 14R, 14L (14), and active (valid) information determined by adding the overlap detection information.

According to the electronic paper management table 54, the presently valid (active) electronic paper 11A (11B) on the right and left faces of the electronic pad 12B (12A) is recognized. Then, the process of inputting an operation signal and the process of transmitting display data are carried out on the basis of the valid (active) electronic paper ID.

FIG. 13 shows electronic paper unique information 55 stored in the ID storage unit 20 of each electronic paper 11A (11B) in the electronic paper recording apparatuses 10A, 10B of the first embodiment (part 1).

The electronic paper unique information 55 is composed of the relevant paper ID, obverse and reverse code, size, and correcting positional information corresponding to the nonvolatile display unit 17 (17R, 17L) for the individual calibration pointers (1) 26*a* to (4) 26*d*.

Figure 14:
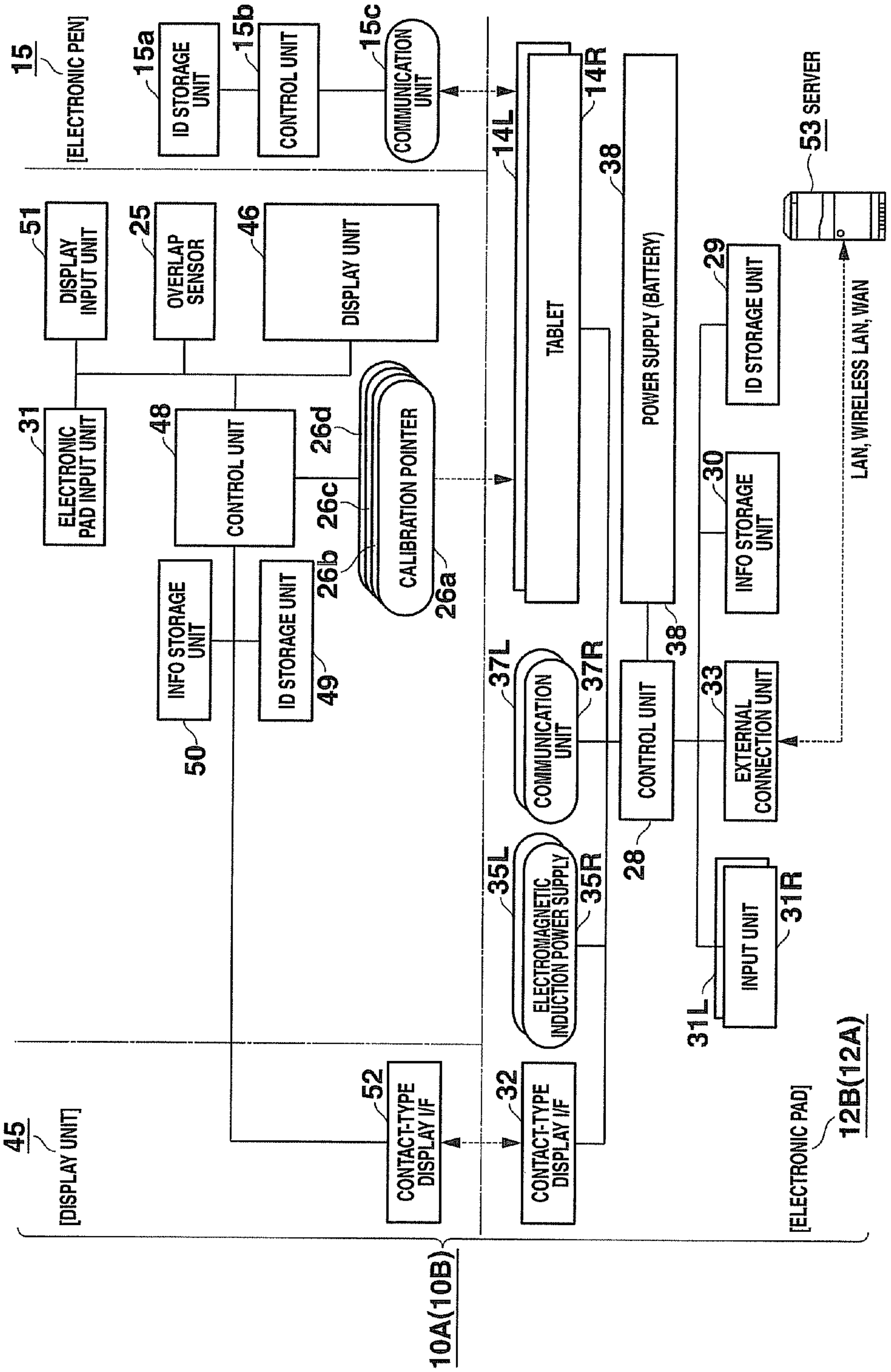
FIG. 14 is a block diagram of an electronic circuit when only a display unit 45 is connected onto the electronic pad 12B (12A) in a case where the electronic paper recording apparatuses 10A, 10B of the first embodiment (part 1) are incorporated as terminals into a thin client (server-based computing) system.

FIG. 14 is a block diagram of an electronic circuit when only the display unit 45 is connected onto the electronic pad 12B (12A) in a case where the electronic paper recording apparatuses 10A, 10B of the first embodiment (part 1) are incorporated as terminals into a thin client (server-based computing) system.

As described in FIG. 10, the electronic circuit of the display unit 45 is such that the LCD display unit 46, ID storage unit 49, information storage unit 50, input units 31, 51, contact-type display I/F 52, overlap sensor 25, and calibration pointers 26*a* to 26*d* are connected, centering around the control unit 48 composed of a low-tech CPU, a computer.

The display unit 45 is placed on the tablets 14R, 14L (14) and bound in the electronic pad 12B (12A) by the binder unit 16 (13), thereby connecting with the pad via the mutual contact-type display I/F 32, 52, which causes the display unit to be supplied with electric power and connected through communication.

Then, the coordinates of the electromagnetic induction signals generated from the calibration pointers 26*a* to 26*d* of the display unit 45 are detected by the tablets 14R, 14L (14) of the electronic pad 12B (12A), thereby detecting the mounting position of the LCD display unit 46 on the tablets 14R, 14L (14).

Program data used for the control unit 48 to control each circuit section of the display unit 45 is stored in the information storage unit 50. The information storage unit 50 stores not only key operation input data from the input units 31, 51 but also handwriting position detection input data on the electronic pad 12B (12A) from the electronic pen 15, text and image input data from the externally connected server unit 53, and display data to be displayed on the LCD display unit 46.

Figure 15:
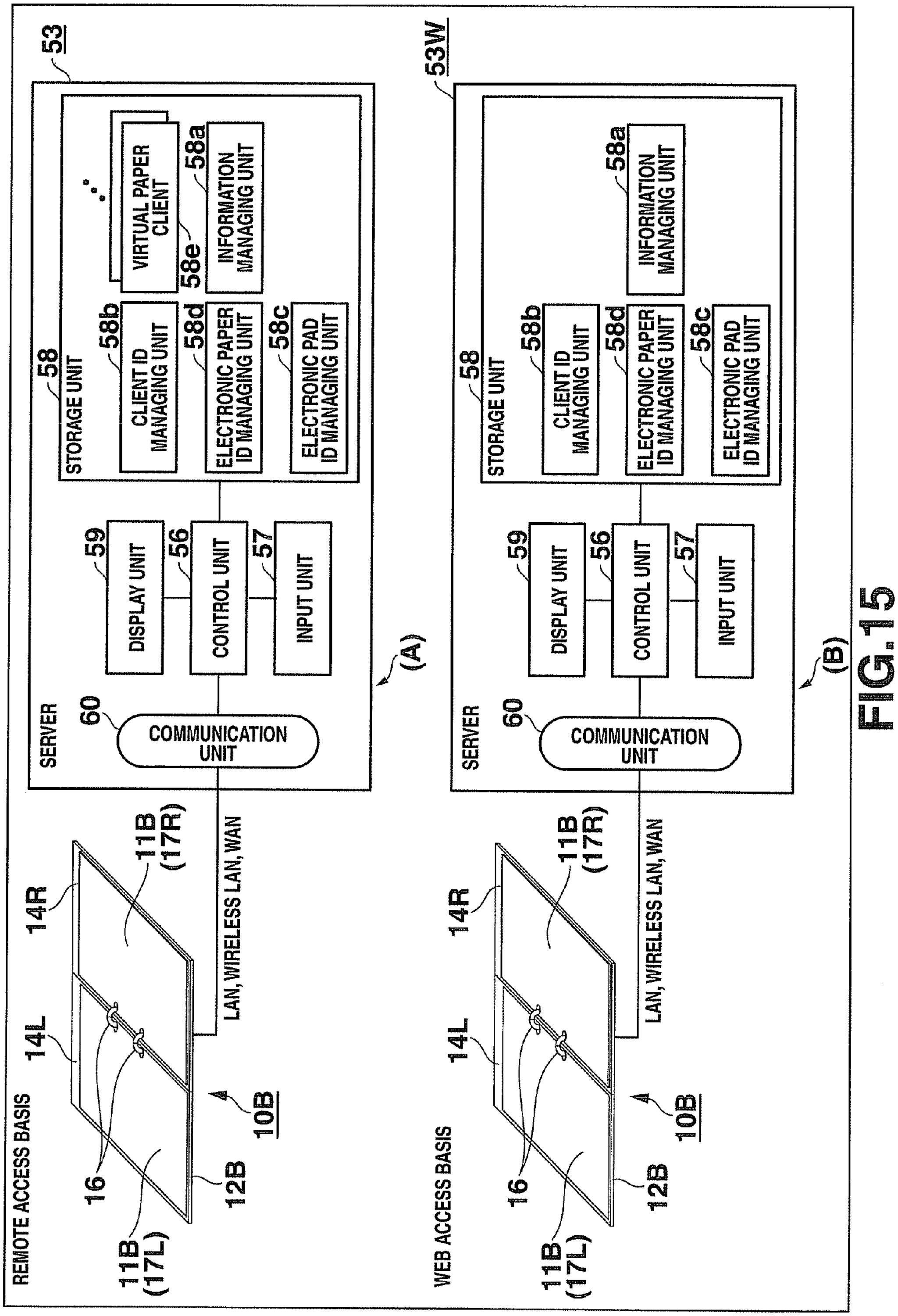
FIG. 15 is a block diagram showing a configuration when the electronic paper recording apparatus 10B of the first embodiment (part 1) is connected as a terminal to a server unit on a network, (A) showing a case where the apparatus is connected to a server unit 53 in a thin client system and used on a remote access basis and (B) showing a case where the apparatus is connected to a server unit 53W in an Internet system and used on a Web access basis.

FIG. 15 is a block diagram showing a configuration when the electronic paper recording apparatus 10B of the first embodiment (part 1) is connected as a terminal to a server unit on a network, (A) showing a case where the apparatus is connected to a server unit 53 in a thin client system and used on a remote access basis and (B) showing a case where the apparatus is connected to a server unit 53W in an Internet system and used on a Web access basis.

Each of the server units 53, 53W includes a control unit 56 composed of a CPU, a computer. An input unit 57, a storage unit 58, a display unit 59, and a communication unit 60 for making a communication connection with a terminal (electronic paper recording apparatus 10B) on a network (LAN, wireless LAN, or WAN) are connected, centering around the control unit 56.

In the storage unit 58 of the server units 53, 53W, the following are created: an information managing unit 58*a* for storing and managing various pieces of control information and such information as contents to be delivered according to the request from each terminal (electronic paper recording apparatus 10B), a client ID managing unit 58*b* for storing and managing the ID of each client, an electronic pad ID managing unit 58*c* for storing and managing the ID of the electronic pad 12B in each terminal (electronic paper recording apparatus 10B), and an electronic paper ID managing unit 58*d* for storing and managing the ID of the electronic paper 11B bound in each electronic pad 12B managed at the electronic pad ID managing unit 58*c*.

As shown in (A) of FIG. 15, when the terminal (electronic paper recording apparatus 10B) is used in a thin client system on a remote basis, a virtual paper client 58*e* for storing and managing control information and operating state information, such as display content, corresponding to each electronic paper 11B for each terminal electronic pad 12B is created in the server unit 53.

Figure 16:
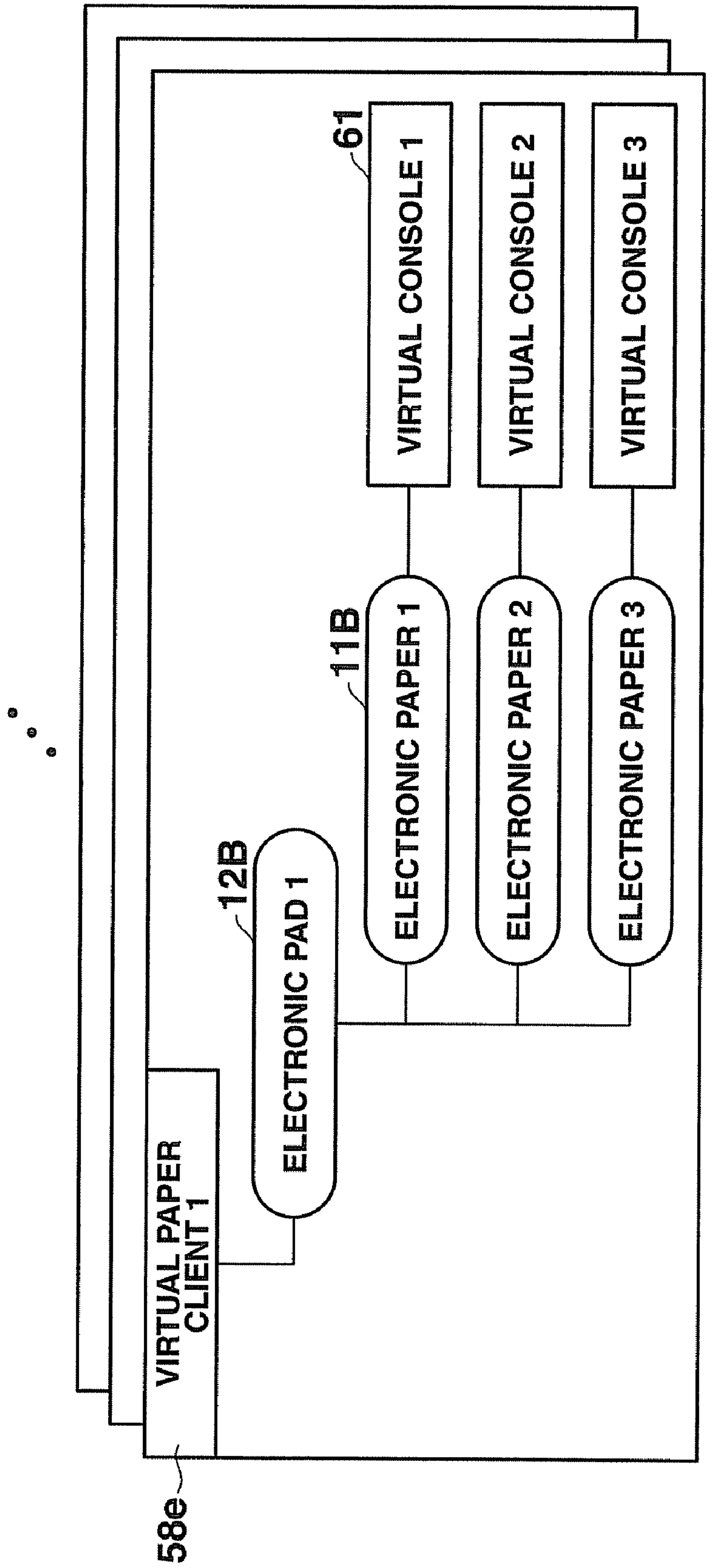
FIG. 16 shows a configuration of a virtual paper client 58*e* created at the server 53 when the electronic paper recording apparatus 10B of the first embodiment (part 1) is used as a terminal of a thin client system.

FIG. 16 shows a configuration of a virtual paper client 58*e* created at the server 53 when the electronic paper recording apparatus 10B of the first embodiment (part 1) is used as a terminal of a thin client system.

In this case, in the virtual paper client 58*e*, a virtual console 61 is created which is for storing and managing control information and operating state information, such as display content, for each electronic paper 11B placed on the electronic pad 12B of each terminal (electronic paper recording apparatus 10B).

FIG. 17 shows basic information stored in and managed at the virtual paper client 58*e* created at the server 53 when the electronic paper recording apparatus 10B of the first embodiment (part 1) has been used as a terminal of a thin client system.

The basic information in the virtual paper client 58*e* is composed of the ID of the electronic pad 12B of a terminal (electronic paper recording apparatus 10B) allowed to login, ID of the electronic paper 11B whose use has been detected at the electronic pad 12B, the obverse and reverse code of the electronic paper 11B, the presence or absence of its validity (activity), and default data on an initial screen for the valid (active) electronic paper 11B.

FIG. 18 shows the contents of a user authentication table 62 stored in and managed at the client ID managing units 58*b* of the server units 53, 53W of the server client system in FIG. 15.

In the user authentication table 62, the user ID previously set for each terminal (electronic paper recording apparatus 10B) capable of logging in the server units 53, 53W and its authentication password are stored and managed in such a manner that the user ID is caused to correspond to the password.

FIG. 19 shows the contents of an electronic paper authentication table 63 stored in and managed at the electronic paper ID managing units 58*d* of the server units 53, 53W of the server client system in FIG. 15.

In the electronic paper authentication table 63, the paper ID for each electronic paper 11B bound in for each electronic pad 12B managed at the electronic pad ID managing unit 58*c*, its user ID, ID of the electronic pad 12B in which electronic paper 11B has been bound, and ID of the electronic pen 15 previously permitted to be used for the electronic paper 11B are stored and managed in such a manner that the paper ID is caused to correspond to the user ID, electronic pad ID, and electronic pen ID.

FIG. 20 shows the contents of an electronic pen function table 64 stored in and managed at the information storage unit 30 of the electronic pads 12A, 12B in the electronic paper recording apparatuses 10A, 10B of the first embodiment (part 1).

In the electronic pen function table 64, ID of each electronic pen 15, the display color of a handwritten locus according to handwriting input by the electronic pen 15 with the pen ID, and the previously set line width of the handwritten locus are stored and managed.

Next, the operation when the electronic paper recording apparatuses 10A, 10B of the first embodiment configured as described above have been incorporated as terminals into a thin client system (see FIGS. 11 to 20) will be explained.

Figure 21:
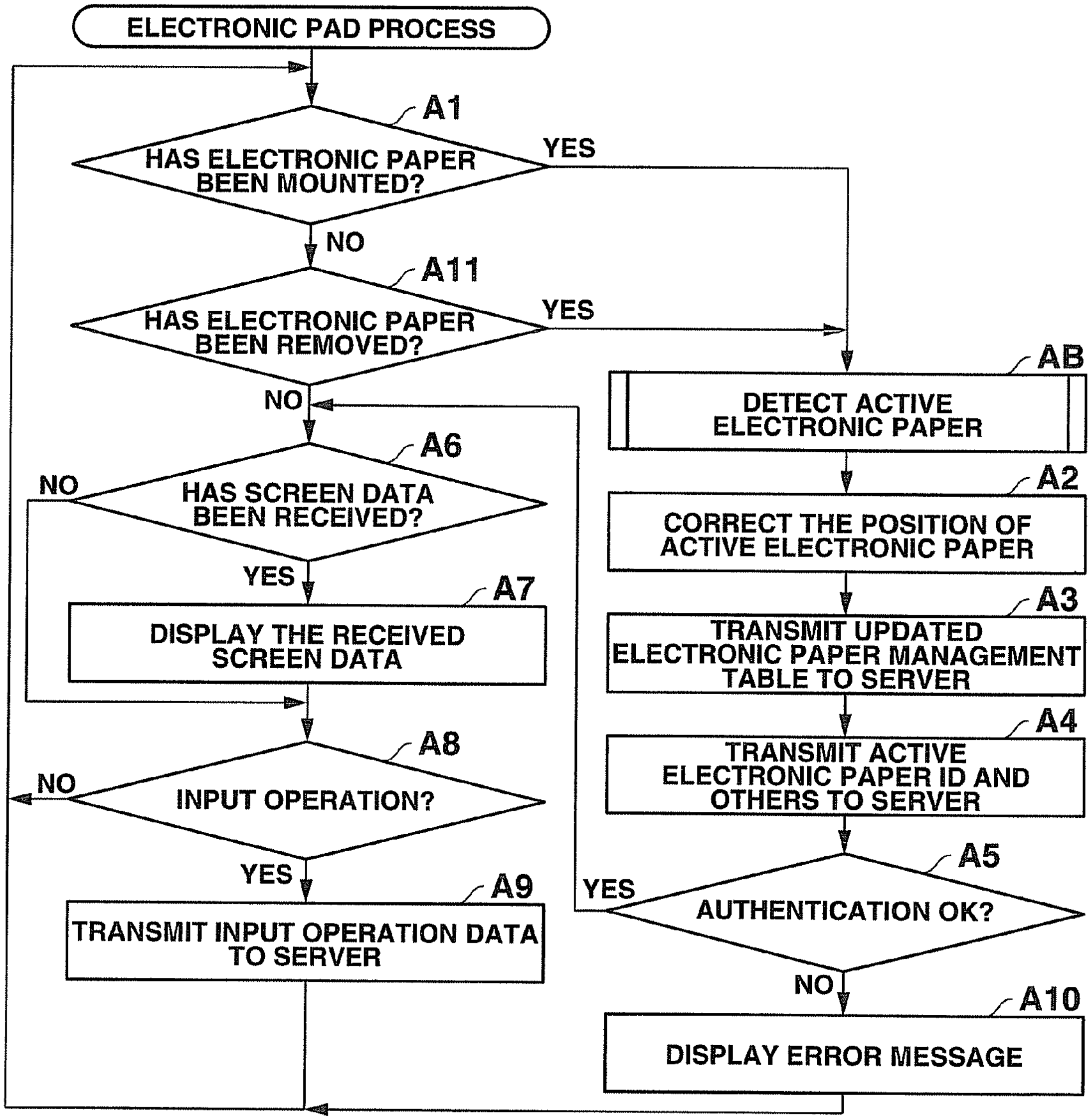
FIG. 21 is a flowchart to help explain the processes at the electronic pads 12A, 12B in the electronic paper recording apparatuses 10A, 10B of the first embodiment (part 1)

FIG. 21 is a flowchart to help explain the processes at the electronic pads 12A, 12B in the electronic paper recording apparatuses 10A, 10B of the first embodiment (part 1).

Figure 22:
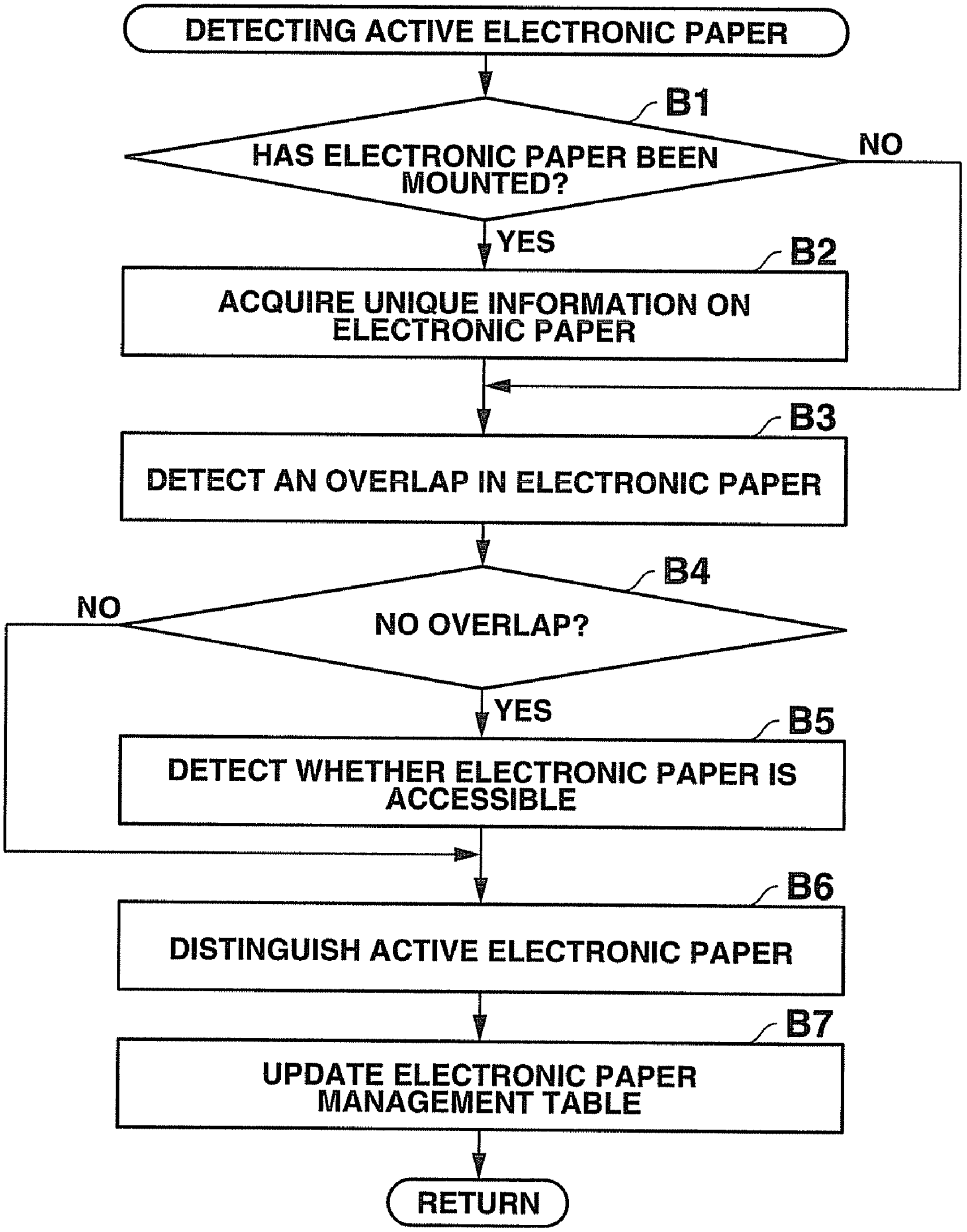
FIG. 22 is a flowchart to help explain an active electronic paper detecting process accompanying an electronic pad process in the electronic paper recording apparatuses 10A, 10B of the first embodiment (part 1)

FIG. 22 is a flowchart to help explain an active electronic paper detecting process accompanying an electronic pad process in the electronic paper recording apparatuses 10A, 10B of the first embodiment (part 1).

Figure 23:
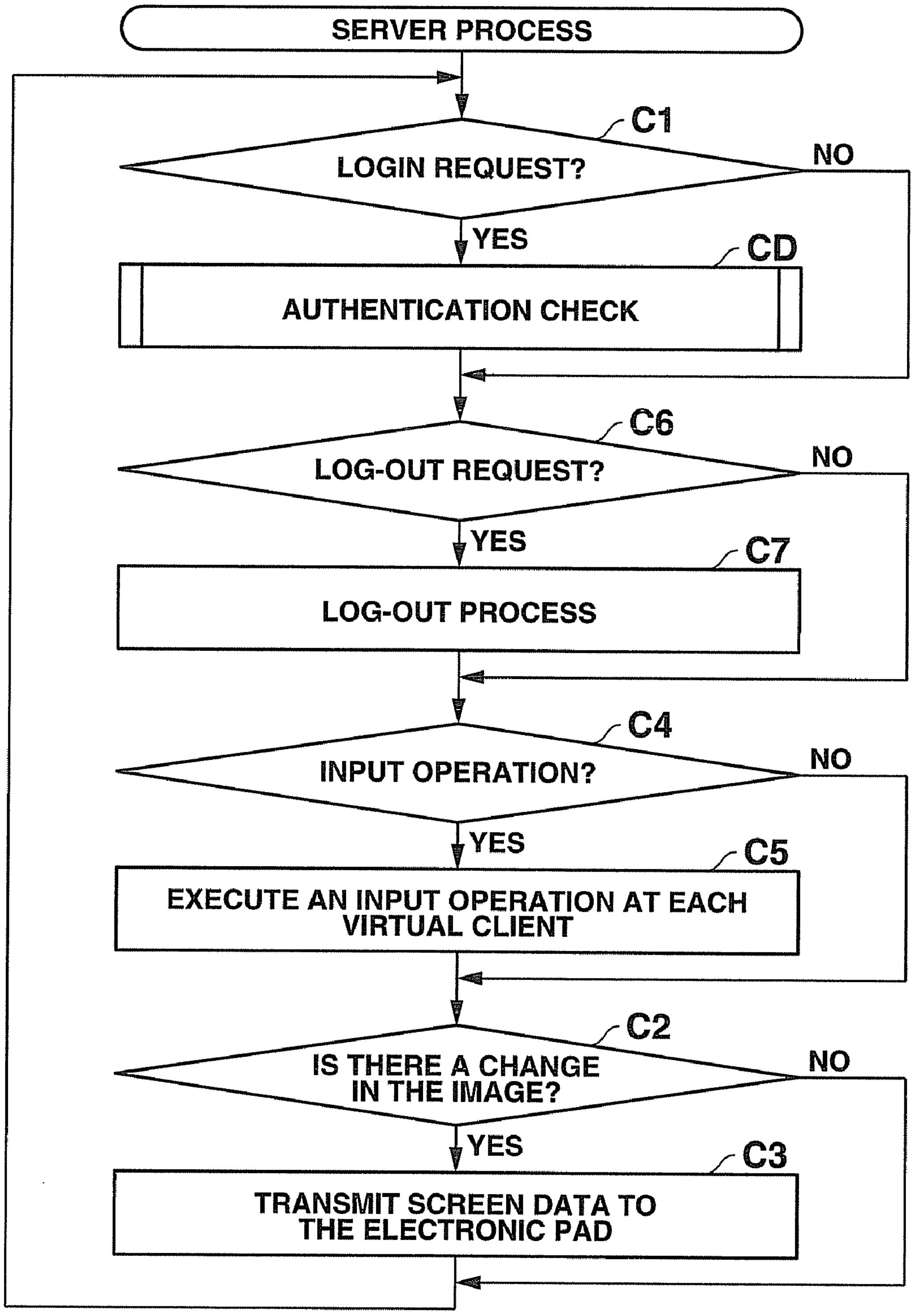
FIG. 23 is a flowchart to help explain a server process at a server unit 53 in a thin client system into which the electronic paper recording apparatuses 10A, 10B of the first embodiment (part 1) have been incorporated as terminals.

FIG. 23 is a flowchart to help explain a server process at the server unit 53 in a thin client system into which the electronic paper recording apparatuses 10A, 10B of the first embodiment (part 1) have been incorporated as terminals.

Figure 24:
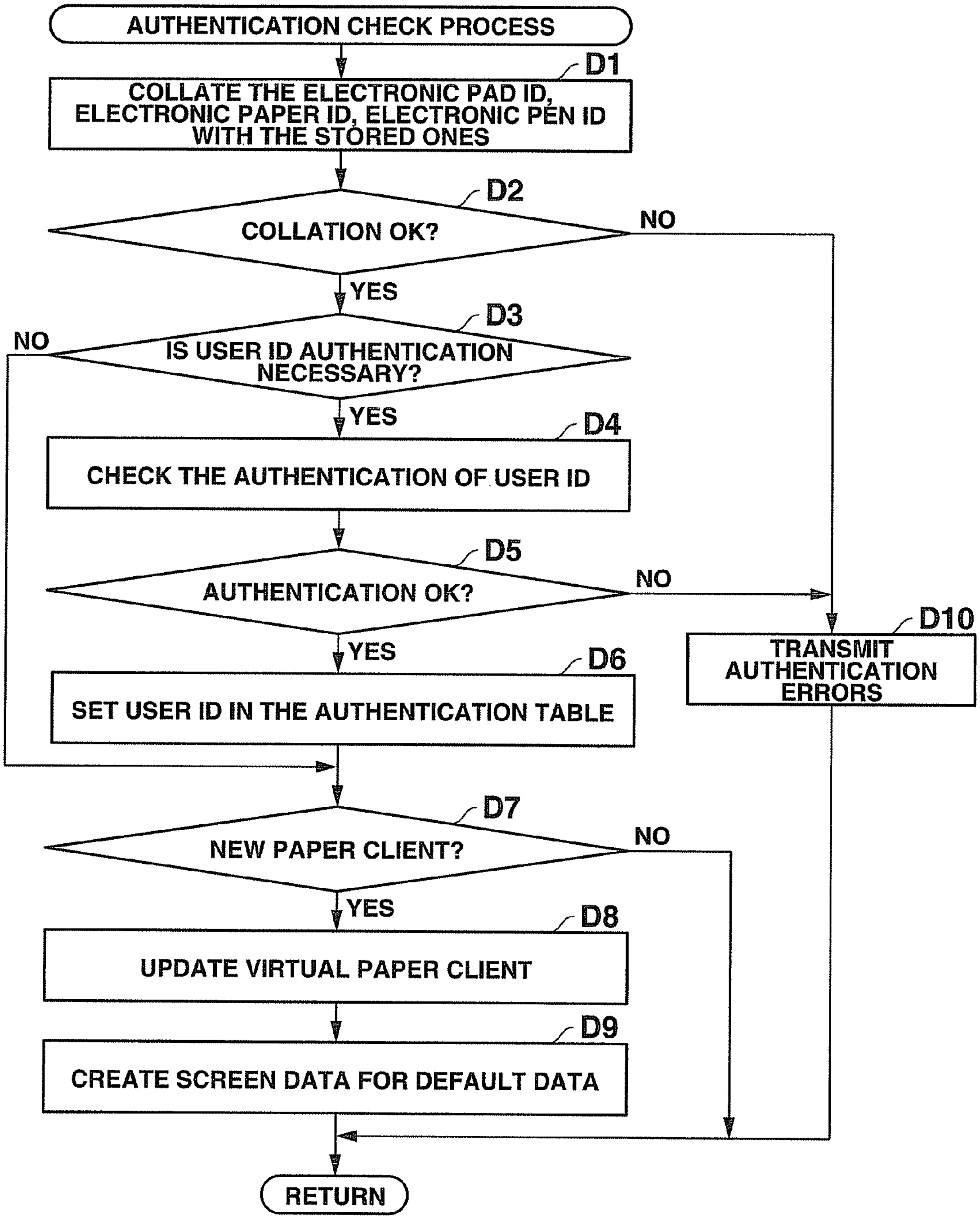
FIG. 24 is a flowchart to help explain an authentication check process accompanying a server process at a server unit 53 into which the electronic paper recording apparatuses 10A, 10B of the first embodiment (part 1) have been incorporated as terminals.

FIG. 24 is a flowchart to help explain an authentication check process accompanying a server process at the server unit 53 into which the electronic paper recording apparatuses 10A, 10B of the first embodiment (part 1) have been incorporated as terminals.

If the control unit 28 has determined that the electronic paper (double-sided type) 11B has been placed on the electronic pad (double-sided type) 12B of the electronic paper recording apparatus (double-sided type) 10B (step A1 (Yes)), on the basis of the detection of connection at the electromagnetic induction power supply units 35R, 35L and communication units 37R, 37L in the binder unit 16, control is passed to the active electronic paper detecting process in FIG. 22 (step AB).

If the active electronic paper detecting process is activated and it is determined whether the electronic paper (double-sided type) 11B has been placed (step B1), the unique information (see FIG. 13) on the electronic paper 11B is read from the ID storage section 20 via the mutual communication units 37R (37L), 23 in the electromagnetic induction unit of the binder unit 16 (step B2) and at the same time, overlap detection signals from the overlap sensors 25R, 25L are acquired (step B3), and it is determined whether there is an overlap in the electronic paper 11B (step B4).

If it has been determined that there is no overlap, on the basis of the overlap detection signal from either the obverse side or reverse side of the placed electronic paper 11B (step B4 (Yes)), it is detected whether the paper is accessible (step B5), depending on whether the electromagnetic induction signals indicting the electronic paper 11B output from the calibration pointers 26*a* to 26*d* have been detected by the tablets 14R, 14L (step B5) and it is determined whether the obverse side (or reverse side) of the electronic paper 11B is active (valid) (step B6).

Then, the electronic paper management table 54 (see FIG. 12) stored and managed by the information storage unit 30 is updated on the basis of unique information on the electronic paper 11B acquired in step B2, overlap detection information acquired in step B3, and active (valid) paper information determined in steps B5, B6 (step B7).

If the active (valid) electronic paper 11B has been detected as a result of the electronic paper 11B being placed on the electronic pad 12B (step AB), the amount of correction of the coordinates in the detected position of handwriting with the electronic pen 15 on the tablet 14R (14L) and the resulting display writing position on the active electronic paper 11B is calculated according to the coordinates of the positions of the calibration pointers 26*a* to 26*d* detected by the tablet 14R (14L) for the electronic paper 11B determined to be active.

Then, the further updated electronic paper management table 54 (see FIG. 12) is read from the information storage unit 30 and transmitted to the externally connected server 53 (step A3). At the same time, the paper ID of the electronic paper 11B determined to be active, the pad ID read from the ID storage unit 29 of the electronic pad 12B on which the electric paper has been placed, and the pen ID of the electronic pen 15 usable with the electronic pad 11B stored and managed in the electronic pen function table 64 (see FIG. 20) are also transmitted as a login request to the server unit 53 (step A4). Then, it is determined whether a login authentication is acceptable (step A5).

In the server process (see FIG. 23) at the server unit 53, if it has been determined that the login request from the electronic pad 12B has been received (step C1), control is passed to an authentication check process in FIG. 24 (step CD).

In the authentication check process at the server unit 53, each of the paper ID of the electronic paper 11B determined to be active, the pad ID of the electronic pad 12B, and the pen ID of the electronic pen 15 usable with the electronic pad 11B received together with the login request from the electronic pad 12B of the electronic paper recording apparatus 10B serving as the terminal is collated with the electronic paper ID, electronic pad ID, and electronic pen ID registered in the electronic paper authentication table 63 (see FIG. 19) stored in and managed at the electronic paper ID managing unit 58*d* (step D1), thereby determining whether the former coincides with the latter (step D2).

If it has been determined that the combination of the electronic paper ID, electronic pad ID, and electronic pen ID coincides with the combination of those registered in the electronic paper authentication table 63 (step D2 (Yes)), it is determined whether the user ID has to be authenticated, depending on whether the user ID has been registered so as to correspond to the electronic paper ID, electronic pad ID, and electronic pen ID determined to coincide with the registered ones (step D3).

If it has been determined that the user ID has to be authenticated, as a result of the user ID having been determined to be unregistered for the electronic paper ID, electronic pad ID, and electronic pen ID determined to coincide with the registered ones (step D3 (Yes)), the input request is displayed on the nonvolatile display unit 17 of the electronic paper 11B determined to be active and a user ID authentication check process is executed according to a request to input the user ID and password transmitted to the electronic pad 12B (step D4).

When the user inputs data from the input unit 24R (24L) of the electronic paper 11B, the user ID and password displayed on the nonvolatile display unit 17 are transferred to the electronic pad 12B in communication and transmitted to the server unit 53, and the server unit 53 receives the user ID and password, they are collated with the user ID and password registered in the user authentication table 62 (see FIG. 18) stored in and managed at the client ID managing unit 58*b* and it is determined whether the former coincide with the latter (step D5).

If it has been determined from the user authentication table 62 that the combination of the user input user ID and password coincides with that of the registered ones (step D5 (Yes)), the user ID determined to coincide with the registered one is set (or registered) so as to correspond to the electronic paper ID, electronic pad ID, and electronic pen ID authenticated this time in the electronic paper authentication table 63 (see FIG. 19) stored in and managed at the electronic paper ID managing unit 58*d* (step D6).

Here, if the electronic paper 11B whose user ID has been newly set (registered) in the electronic paper authentication table 63 is determined to be a new paper client unregistered in the virtual paper client 58*e* (see FIGS. 16 and 17) (step D7 (Yes)), a virtual console 61 corresponding to the combination of the electronic pad 12B and electronic paper 11B authenticated this time by the virtual paper client 58*e* is created and updated (step D8).

Then, default data to be displayed as an initial screen on the electronic paper 11B determined to be active is created and stored so as to correspond to the combination of the electronic pad 12B (ID) and the electronic paper 11B (ID) updated this time in the virtual paper client 58*e* (step D9).

In step D2, if it has been determined that the combination of the electronic paper ID, electronic pad ID, and electronic pen ID authenticated this time does not coincide with that of the registered ones, or if it has been determined in step D5 that the combination of the user ID and password input by the user does not coincide with that of the registered ones, an authentication error is transmitted to the electronic pad 12B requesting a login (step D10) and an error message is displayed on the nonvolatile display unit 17R (17L) of the electronic paper 11B determined to be active (step A5→step A10).

In step D9 of the authentication check process, if default initial screen data to be displayed on the authenticated electronic paper 11B has been created and stored so as to correspond to the combination of the electronic pad 12B (ID) and electronic paper 11B (ID) authenticated and updated this time in the virtual paper client 58*e* (see FIGS. 16 and 17), the virtual console 61 of the electronic paper 11B determines that there is a change in the screen (step C2 (Yes)) and the initial screen data is transmitted to the electronic pad 12B which has made a login request (step C3).

In the electronic pad 12B, if it has been determined that the authentication OK signal has been received according to the authentication check process (step CD) at the server unit 53 (step A5 (Yes)) and that the initial screen data transmitted according to the server process (steps C2, C3) has been received (step A6 (Yes)), the initial screen data is transmitted in communication to the newly placed electronic paper 11B determined to be active, thereby displaying the initial screen data on the nonvolatile display unit 17R (17L) (step A7).

Then, if the user performs handwriting input with the electronic pen 15 on the display screen of the nonvolatile display unit 17R (17L) of the active electronic paper 11B, the input position is detected by the tablet 14R (14L) of the corresponding electronic pad 12B or the user carries out key input at the input unit 24R (24L) of the same electronic paper 11B. As a result, the key input signal is transferred in communication to the input unit 24R (24L) or the user carries out key input at the input unit 31R (31L) of the electronic pad 12B. Then, if it has been determined that there has been an input operation (step A8), the input operation data is transmitted to the server unit 53 (step A9).

If the server unit 53 has received the positional coordinates of the handwritten input with the electronic pen transmitted from the electronic pad 12B or the input operation data from the input keys (step C4 (Yes)), the virtual console 61 of the electronic paper 11B corresponding to the source of the input operation data executes the process of displaying the locus corresponding to the positional coordinates of the handwritten input according to the input operation data or the process following the input key instruction. As a result of the processes, screen data is created (step C5).

Then, if it has been determined that the image data in the virtual console 61 of the electronic paper 11B has been rewritten and that there is a change in the image for the screen data being displayed (step C2 (Yes)), the screen data after the image has been changed is transmitted to the electronic pad 12B (step C3).

Then, in the electronic pad 12B, the changed screen data received from the server unit 53 is transmitted in communication to the electronic paper 11B, thereby displaying the data on the nonvolatile display unit 17R (17L) (step A6→step A7).

Specifically, if the user input operation is a handwriting input operation on the electronic paper 11B with the electronic pen 15, the starting point coordinates of the handwriting position detected by the tablet 14R (14L) of the electronic pad 12B and vector data composed of its moving direction and distance are transmitted to the server unit 53. Accordingly, in the server unit 53, a handwritten locus according to the vector data is written into the screen data at the virtual console 61 of the electronic paper 11B and the screen data after the change of the handwritten locus caused by handwriting is transmitted to the electronic pad 12B, thereby displaying the screen data on the electronic paper 11B.

In this case, the writing position of handwriting data to the screen data at the virtual console 61 of the electronic paper 11B is subjected to the correction of positional shift according to the amount of correction of the coordinates in the handwriting detection position set in the electronic paper management table 54 transferred to the server unit 53 in step A3 of the electronic pad process and the display writing position for the active electronic paper 11B. Then, the resulting position is written. Accordingly, even if there is a shift in the position where the active electronic paper 11B is placed on the tablet 14R (14L) of the electronic pad 12B, the handwritten locus data is displayed on the electronic paper 11B so as to correspond correctly to the position in which the user writes by hand with the electronic pen 11B.

Furthermore, if the user input operation is a key input operation at the input unit 24R (24L) performed according to the contents of the screen data displayed on the electronic paper 11B or an input operation where a position on the screen is specified with the electronic pen 15, the key input data or the screen position specified data detected at the tablet 14R (14L) is transmitted to the server unit 53. As a result, in the server unit 53, processes according to the key input data and the screen position specified data are executed and the screen data is updated at the virtual console 61 of the electronic paper 11B. The updated screen data is transmitted to the electronic pad 12 and displayed on the electronic paper 11B.

In the server unit 53, if a log-out request has been received from the electronic pad 12B (12A) of the electronic paper recording apparatus 10B (10A) serving as any one of the terminals now logging on (step C6 (Yes)), the process of logging out of the virtual control 61 of the active electronic paper 11B in the electronic pad 12B (12A) which has made a log-out request is executed (step C7).

On the other hand, if the control unit 28 has determined that, for example, any one of a plurality of electronic papers 11B (11A) placed on the electronic pad 12B (12A) has been removed from the binder unit 16 (13), on the basis of the disconnection detected at the electromagnetic induction power supply units 35R, 35L and communication units 37R, 37L (step A11 (Yes)), the process of detecting an active electronic paper is carried out again with any one of the electronic papers 11B (11A) being removed (step AB). As a result, the process of correcting the handwriting display coordinate position on the electronic paper 11B (11A) determined to be active (step A2), the process of transmitting the updated electronic paper management table 54 to the server unit 53 (step A3), and the process of transmitting the electronic paper ID determined to be active, electronic pad ID, and electronic pen ID (step A4) to the server unit 53 making a login request are carried out as described above. Then, it is determined whether the authentication of the electronic paper is acceptable (step A5).

At this time, in the authentication check process at the server unit 53 (step CD) (see FIG. 24), if the electronic paper 11B (11A) determined to be active this time has already been authenticated, it has been determined that the authentication of the user ID is not needed (step D3 (No)) and that the electronic paper is not a new electronic paper client (step D7 (No)), which completes the authentication check process. Then, in the electronic pad 12B, it has been determined that the authentication is acceptable (step A5 (Yes)).

As a result, in the electronic paper 11B (11A) determined again to be active, processes (step C4→step C5) at the virtual paper client 58*e* in the server unit 53 are carried out according to the transmission (step A8→step A9) of the input operation data from the electronic pad 12B (12A). Consequently, if the screen data has changed, the changed screen data is transmitted to the electronic pad 12B (12A) (step C2→step C3) and is displayed and updated on the nonvolatile display unit 17R (17L) of the electronic paper 11B (11A) (step A6→step A7).

Accordingly, with the electronic paper recording apparatus 10A (10B) of the first embodiment configured as described above, when the electronic paper 11A (11B) having a display screen of the nonvolatile display unit 17 (17R, 17L) over almost all of its surface is placed on the tablet 14 (14R, 14L) provided on the surface of the electronic pad 12A (12B) with the battery power supply 38 and is bound by the binder unit 13 (16), the electronic pad 12A (12B) supplies electric power to and makes a communication connection with the electronic paper 11A (11B) via the electromagnetic induction unit provided so as to correspond to the bind-in structure of the binder unit 13 (16). Then, when a handwriting input operation is performed with the electronic pen 15 on the display screen (17R, 17L) of the electronic paper 11A (11B), the coordinates of the pen input position are detected by the tablet 14 (14R, 14L) of the electronic pad 12A (12B) on which the electronic paper 11A (11B) is laid, and vector data corresponding to the coordinate locus of the pen input position is transferred in communication as display data to the electronic paper 11A (11B) and is displayed on the display screen of the nonvolatile display unit 17 (17R, 17L). Therefore, not only can the display data input from an external information device via the external connection unit 33 of the electronic pad 12A (12B) be displayed on the electronic paper 11A (11B), but also the handwritten data directly written with the electronic pen 15 can be displayed. Moreover, since the electronic paper 11A (11B) can be freely placed on and taken off the electronic pad 12A (12B), this enables the electronic paper to be treated as if it were ordinary paper, by describing information, writing information, or erasing information arbitrarily.

Furthermore, with the electronic paper recording apparatus 10A (10B) of the first embodiment, the tablet 14 (14R, 14L) of the electronic pad 12A (12B) detects the electromagnetic induction signals from the calibration pointers 26*a* to 26*d* provided so as to correspond to the four corners of the screen of the nonvolatile display unit 17 (17R, 17L) of the electronic paper 11A (11B). By doing this, it is determined that the electronic paper 11A (11B) has been placed on the surface of the electronic pad. At the same time, it is determined whether the overlap sensor provided at the surface of each electronic paper 11A (11B) has received light. By doing this, the electronic paper 11A (11B) located at the top page among the electronic papers 11A (11B) stacked one top of another on the surface of the electronic pad is determined. Therefore, even when a plurality of electronic papers 11A (11B) are placed on or removed from the electronic pad 12A (12B), the electronic paper 11A (11B) valid (or active) in writing and displaying data on the electronic pad 12A (12B) can be distinguished easily.

Moreover, with the electronic paper recording apparatus 10A (10B) of the first embodiment, the display position on the electronic paper 11A (11B) according to the handwriting position with the electronic pen 15 detected by the tablet 14 (14R, 14L) is corrected according to the amount of deviation from the specified position of the calibration pointers 26*a* to 26*d* of the electronic paper 11A (11B) detected by the tablet 14 (14R, 14L) of the electronic pad 12A (12B). Therefore, even if each electronic paper 11A (11B) bound by the binder unit 13 (16) of the electronic pad 12A (12B) deviates from the tablet 14 (14R, 14L), writing can be displayed on the electronic paper 11A (11B) so as to correspond correctly to the handwriting position with the electronic pen 15.

In addition, with the electronic paper recording apparatus 10A (10B) of the first embodiment, each electronic paper 11A (11B) is caused to store a different paper ID and is identified and managed. Therefore, the electronic paper 11A (11B) determined to be valid (active) can always be identified accurately by adding the paper ID to access information, which enables data to be written and displayed.

Furthermore, the electronic paper recording apparatus 10A (10B) of the first embodiment is incorporated as a terminal into a thin client system and logs into the server unit 53 using the electronic paper 11A (11B) determined to be valid (active). This realizes a so-called electronic paper client assuring the security of data protection without a high-tech terminal.

In the electronic paper recording apparatus 10A (10B) of the first embodiment, the coordinates of the handwriting position with the electronic pen 15 on the electronic paper 11A (11B) bound in the electronic pad 12A (12B) are detected by the tablet 14 (14R, 14L) on the electronic pad 12A (12B) on which the electronic papers 11A (11B) have been laid one on top of another. In place of the tablet 14 (14R, 14L), an ultrasonic digitizer 65 may be incorporated into a binder unit 13*a* of the electronic pad 12A (12B). The digitizer 65 may detect the coordinates of the handwriting position with the electronic pen 15 operated by hand on the surface of the electronic paper 11A (11B) placed on the electronic pad 12A (12B) or the locations of the calibration pointers 26*a* to 26*d* built into the electronic paper 11A (11B). With this configuration, data may be written onto or displayed on the electronic paper 11A (11B) determined to be valid (active) as in the first embodiment.

Figure 25:
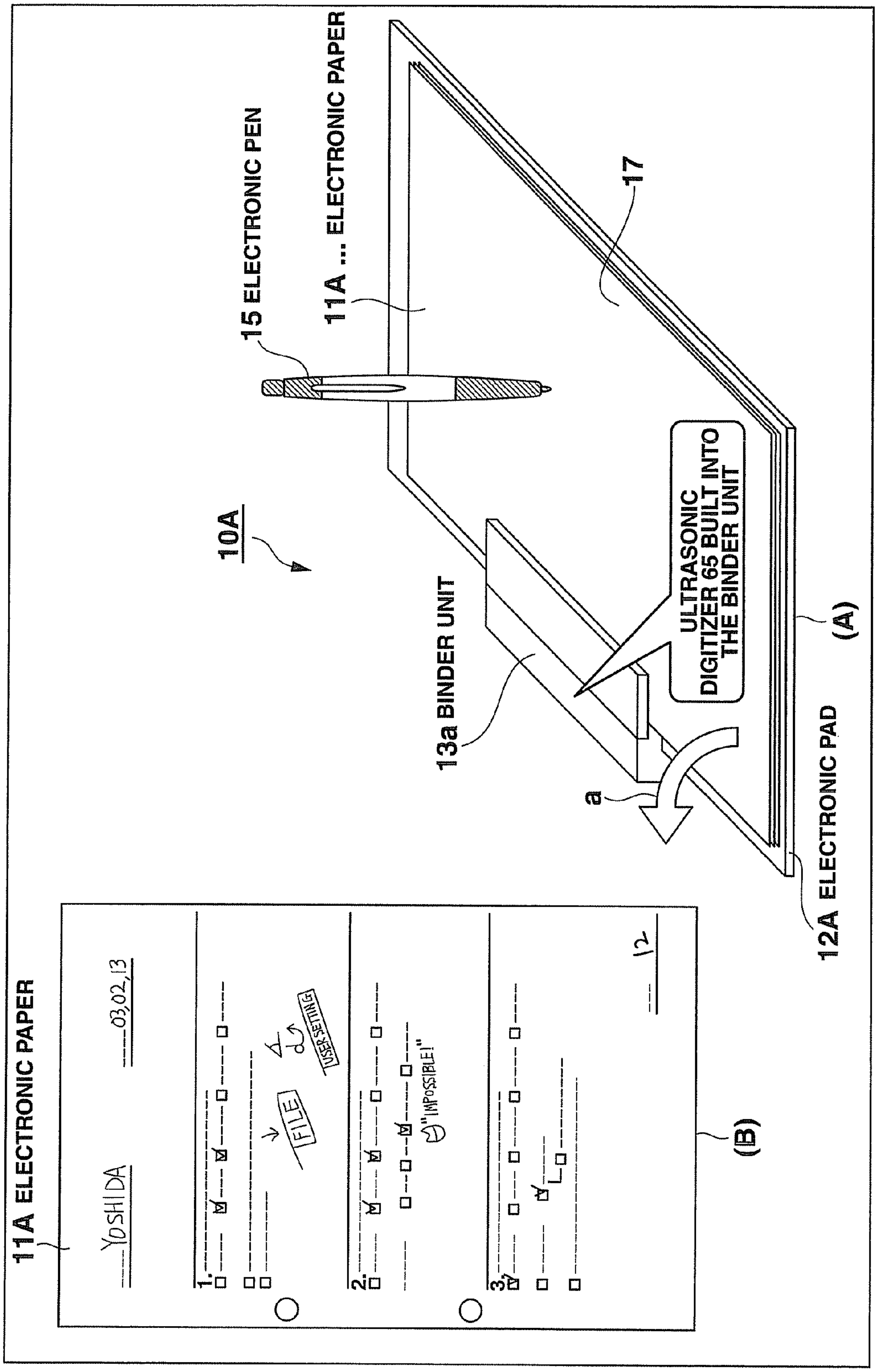
FIG. 25 shows a configuration of an electronic paper recording apparatus (single-sided type) 10A according to a first embodiment (part 2) of the invention, (A) being a perspective view of the electronic paper recording apparatus and (B) being a front view of a single electronic paper (single-sided type) 11A pulled out of the apparatus.

FIG. 25 shows a configuration of an electronic paper recording apparatus (single-sided type) 10A according to the first embodiment (part 2) of the invention, (A) being a perspective view of the apparatus and (B) being a front view of a single electronic paper (single-sided type) 11A pulled out of the apparatus.

Figure 26:
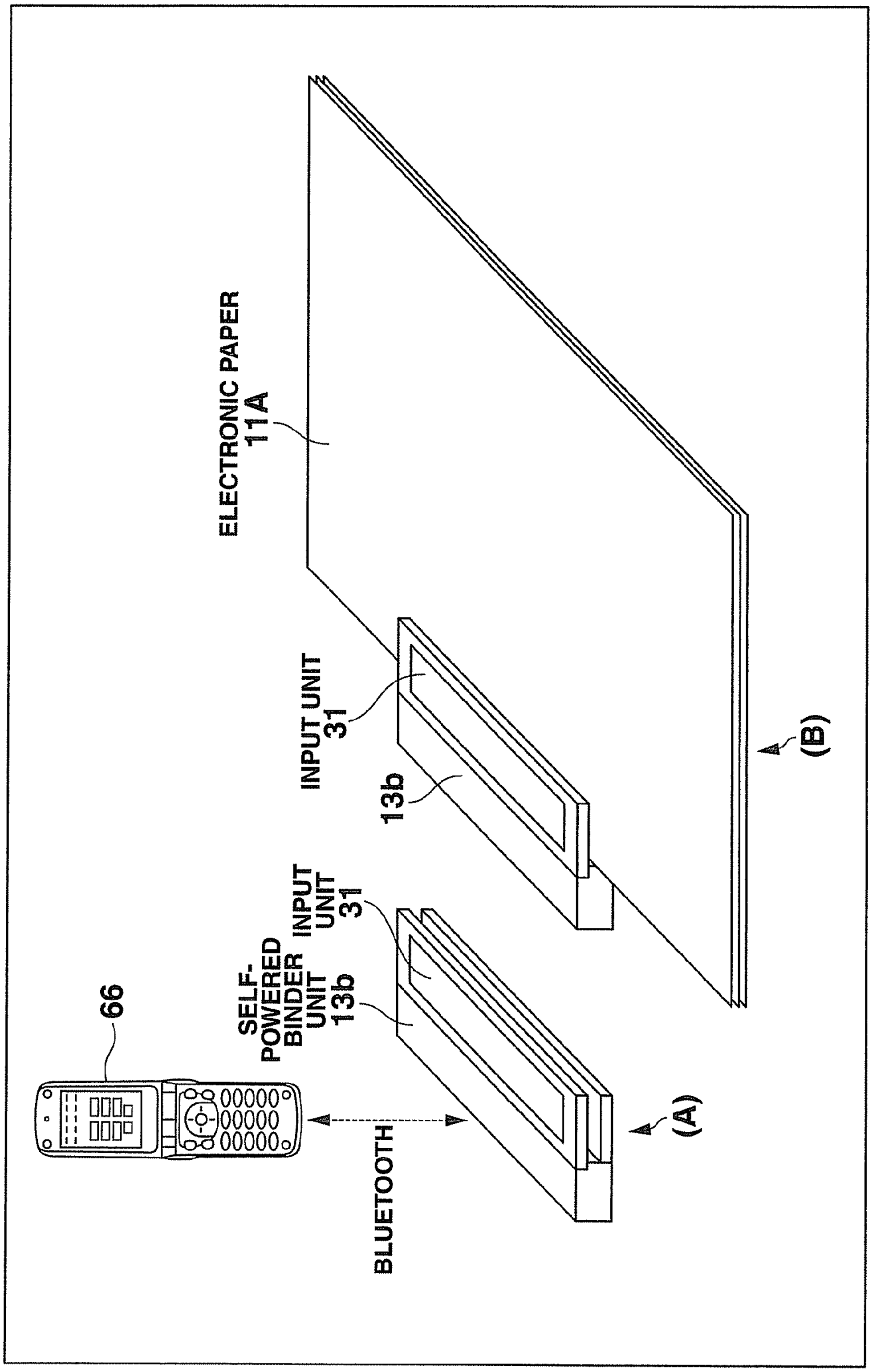
FIG. 26 shows a configuration of an electronic paper recording apparatus (single-sided type) 10A according to a first embodiment (part 3) of the invention, (A) being a perspective view of a self-powered binder unit 13*b* capable of connecting with a portable communication information device 66 at a short distance by wireless and (B) being a perspective view an electronic paper (single-sided type) 11A bound by the binder unit 13*b;*

In the electronic paper recording apparatus 10A (10B) of the first embodiment, when writing or displaying is done on the electronic paper 11A (11B), the electronic paper 11A (11B) is bound in the binder unit 13 of the electronic pad 12A (12B), thereby supplying electric power and making a communication connection via the electromagnetic induction unit provided in the binder unit 13 (16), which enables display data to be written. In contrast, as shown in FIG. 26, an electronic circuit unit (28 to 33) centering around the same electromagnetic induction units (35, 37) as described above and the control unit 28 may be incorporated into a binder unit 13*b* containing a power supply unit (battery) 38 without an electronic pad. With this configuration, data may be input to, displayed on, or edited on the electronic paper 11A according to the input operation on a portable communication information device 66 externally connected by, for example, Bluetooth. Alternatively, various items of data may be input, displayed, or edited by making a communication connection with the server unit 53 of the thin client system via the portable communication information device 66.

FIG. 26 shows a configuration of an electronic paper recording apparatus (single-sided type) 10A according to the first embodiment (part 3) of the invention, (A) being a perspective view of a self-powered binder unit 13*b* capable of connecting with the portable communication information device 66 at a short distance by wireless and (B) being a perspective view an electronic paper (single-sided type) 11A bound by the binder unit 13*b*.

In place of the power supply unit (battery) 38 of the self-powered binder unit 13*b* explained in the first embodiment (part 3) of FIG. 26, the portable communication information device 66 wired to the binder unit 13*b* may supply electric power and data may be input, displayed, or edited in the same manner as described above.

Moreover, in the electronic paper recording apparatus 10A (10B) having the electronic pad 12A (12B) explained with reference to FIGS. 1 to 25, the process of connecting with the server unit 53 on the network may be carried out on the side of the portable communication information device 66 (see FIG. 26) externally connected to the electronic pad 12A (12B).

Figure 27:
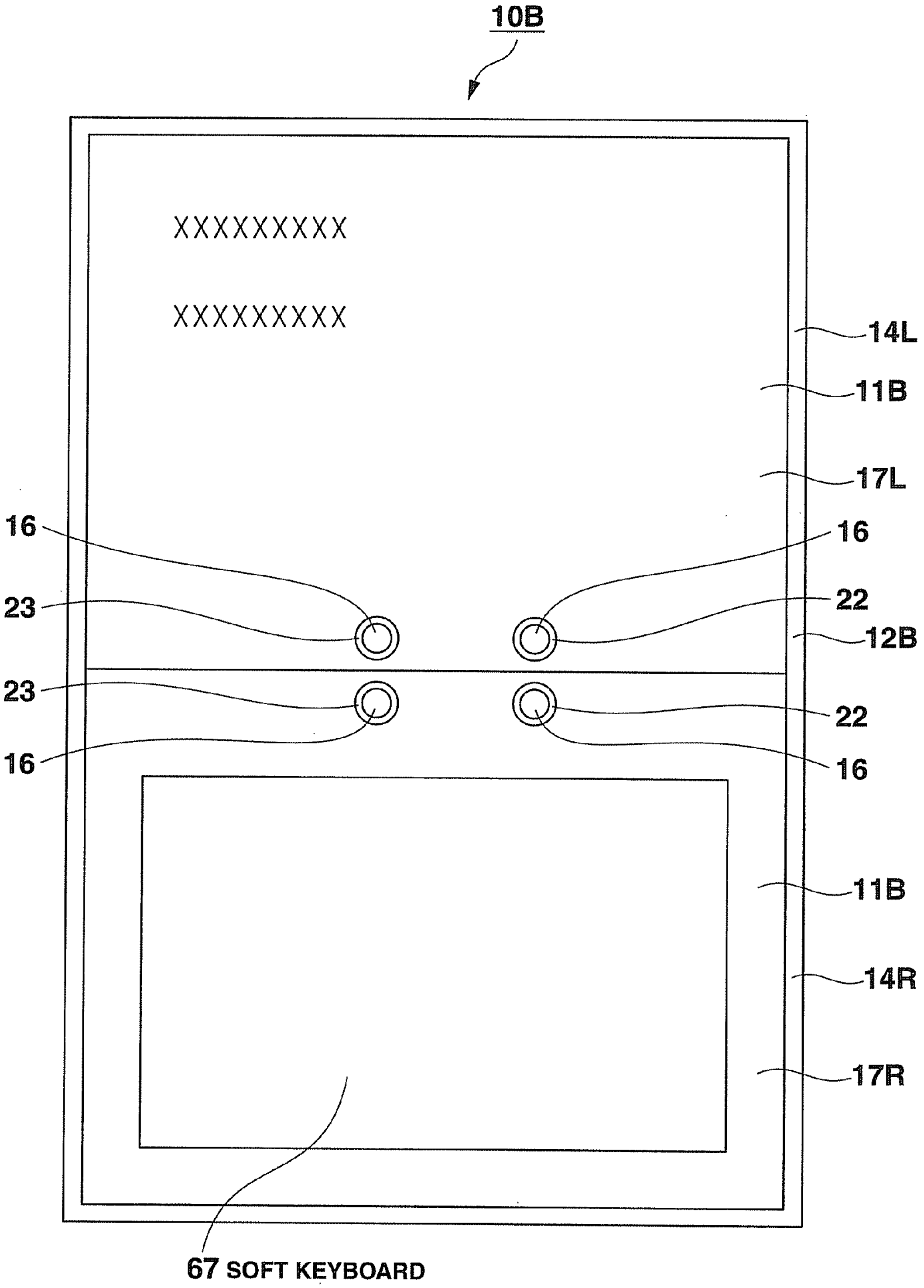
FIG. 27 is a front view of an electronic paper recording apparatus (double-sided type) 10B according to a first embodiment (part 4) of the invention.

FIG. 27 is a front view of an electronic paper recording apparatus (double-sided type) 10B according to the first embodiment (part 4) of the invention.

In the electronic paper recording apparatus (double-sided type) 10B according to the first embodiment (part 4), a soft keyboard 67 is displayed on, for example, the nonvolatile display unit 17R at the surface of the electronic paper 11B placed on the right face of the electronic pad 12B according to a soft key processing program previously stored in the information storage unit 30 of the electronic pad 12B. Then, the touch operation position on the displayed soft keyboard 67 is detected by the tablet 14R of the electronic pad 12B, thereby recognizing the contents of the touched key. As a result, a process corresponding to the key operation is executed at the control unit 28 of the electronic pad 12B or at the externally connected server unit 53. The display data is displayed on the nonvolatile display unit 17L on the reverse side of the electronic paper 11B placed on the left face of the electronic pad 12B, thereby realizing a configuration that functions as if a PC (personal computer) terminal were in use.

Moreover, instead of the soft keyboard 67 explained with reference to FIG. 27, a paper-type keyboard 11AK on which a full keyboard 68 has been printed may be placed on the electronic pad 12B as in the above embodiment, thereby achieving a configuration that makes it possible to supply electric power and make a communication connection by electromagnetic induction. Then, the paper-type keyboard 11AK alone is caused to output a key operation signal, causing the control unit 28 of the electronic pad 12B or the externally connected server unit 53 to execute the process corresponding to the key operation signal. The resulting display data may be displayed on the nonvolatile display unit 17L (17R) of the electronic paper 11B placed on the other face of the electronic paper 12B and be used as a PC (personal computer) terminal.

Figure 28:
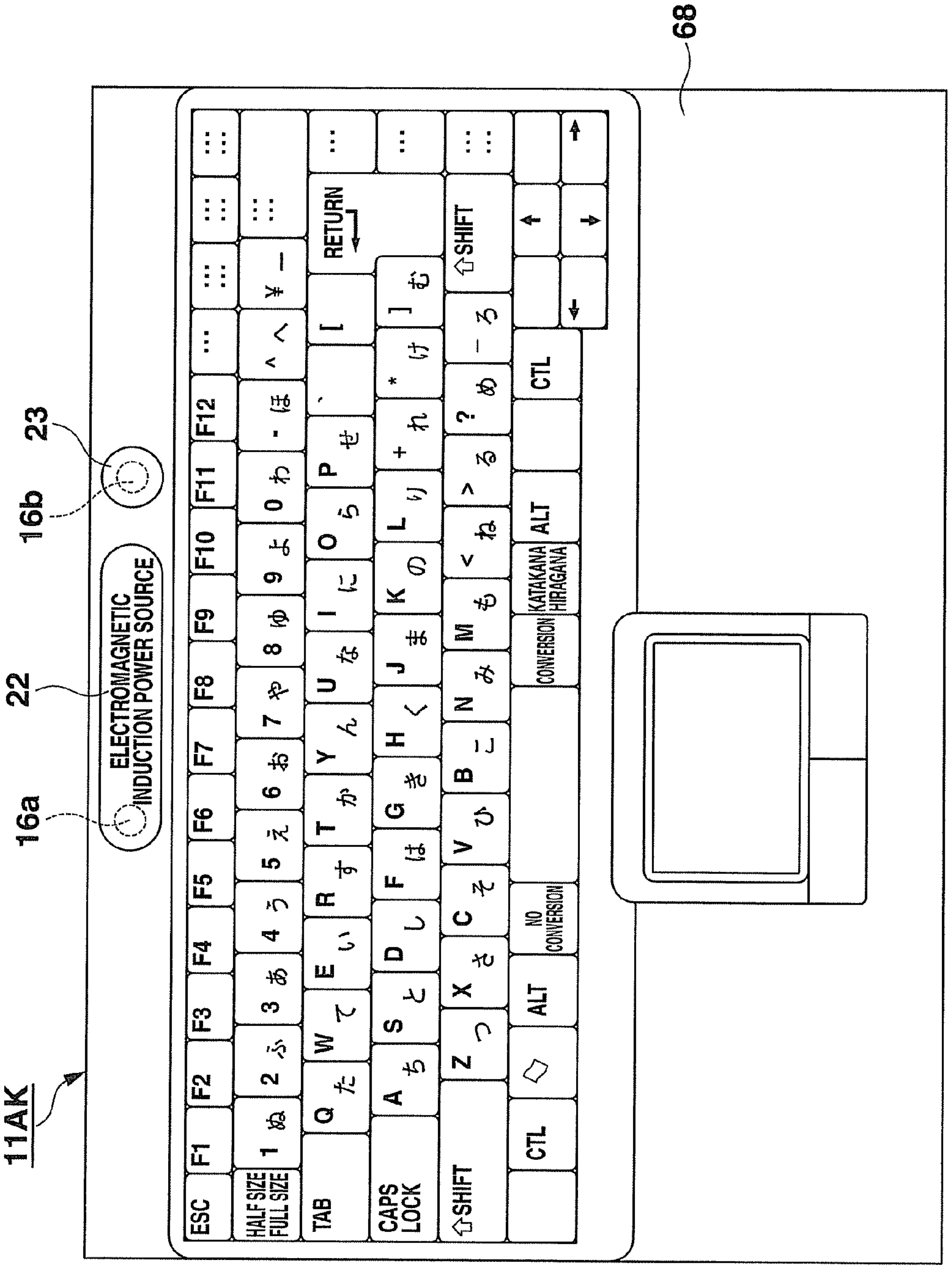
FIG. 28 is a front view of a paper-type keyboard 11AK mounted on the electronic pad 12B in an electronic paper recording apparatus (double-sided type) 10B according to a first embodiment (part 5) of the invention.

FIG. 28 is a front view of a paper-type keyboard 11AK mounted on the electronic pad 12B in an electronic paper recording apparatus (double-sided type) 10B according to the first embodiment (part 5) of the invention.

In the electronic paper recording apparatuses 10A, 10B of the first embodiment, the coordinate detecting unit for detecting the touch input position as a result of a user operation on the electronic paper 11A (11B) may be not only the electromagnetic induction tablet 14 (14R, 14L) and the ultrasonic digitizer 65 but also a resistive pressure-sensitive tablet, an optical tablet, or a capacitance pressure-sensitive tablet.

Moreover, the wireless connection unit between the electronic paper 11A (11B) and the electronic pad 12A (12B) may be not only of the electromagnetic induction type but also of a radio wave type.

Furthermore, in the electronic paper recording apparatuses 10A, 10B of the first embodiment, the digitizer 65 built in the tablet 14 (14R, 14L) or binder unit 13 (16) provided on the electronic pad 12A (12B) detects the touch input position on the active (valid) electronic paper 11A (11B). As in electronic paper recording apparatuses 10A', 10B' explained in a second embodiment of the present invention, a tablet 14T may be laid on the display screen of the nonvolatile display unit 17 (17R, 17L) and integrated into an electronic paper 11A' (11B').

Second Embodiment

Figure 29:
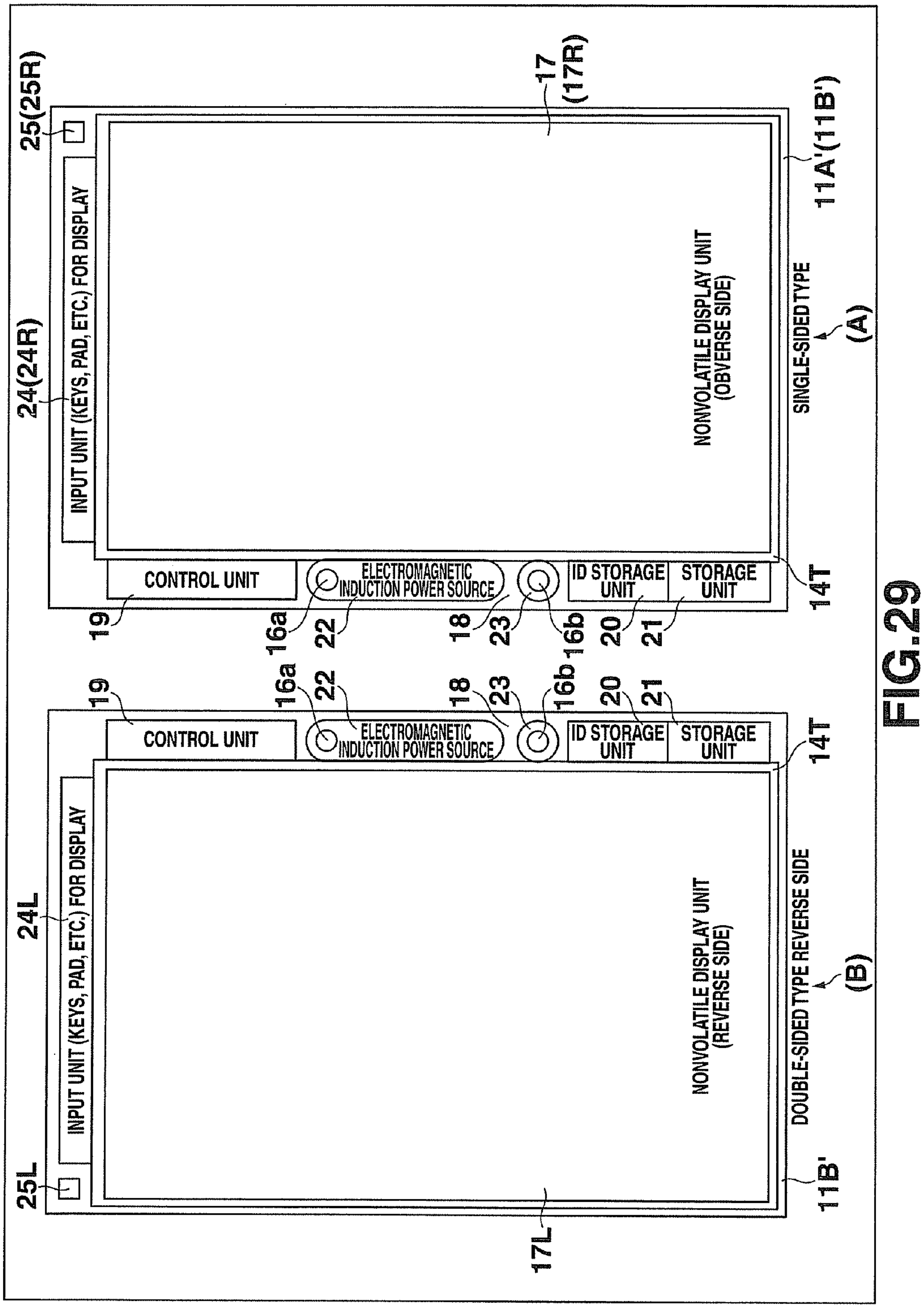
FIG. 29 shows a configuration of electronic papers 11A', 11B' in electronic paper recording apparatuses 10A', 10B' according to a second embodiment of the invention, (A) being a configuration of an electronic paper (single-sided type) 11A' when viewed from the obverse side and (B) being a configuration of an electronic paper (double-sided type) 11B' when viewed from the reverse side.
Figure 30:
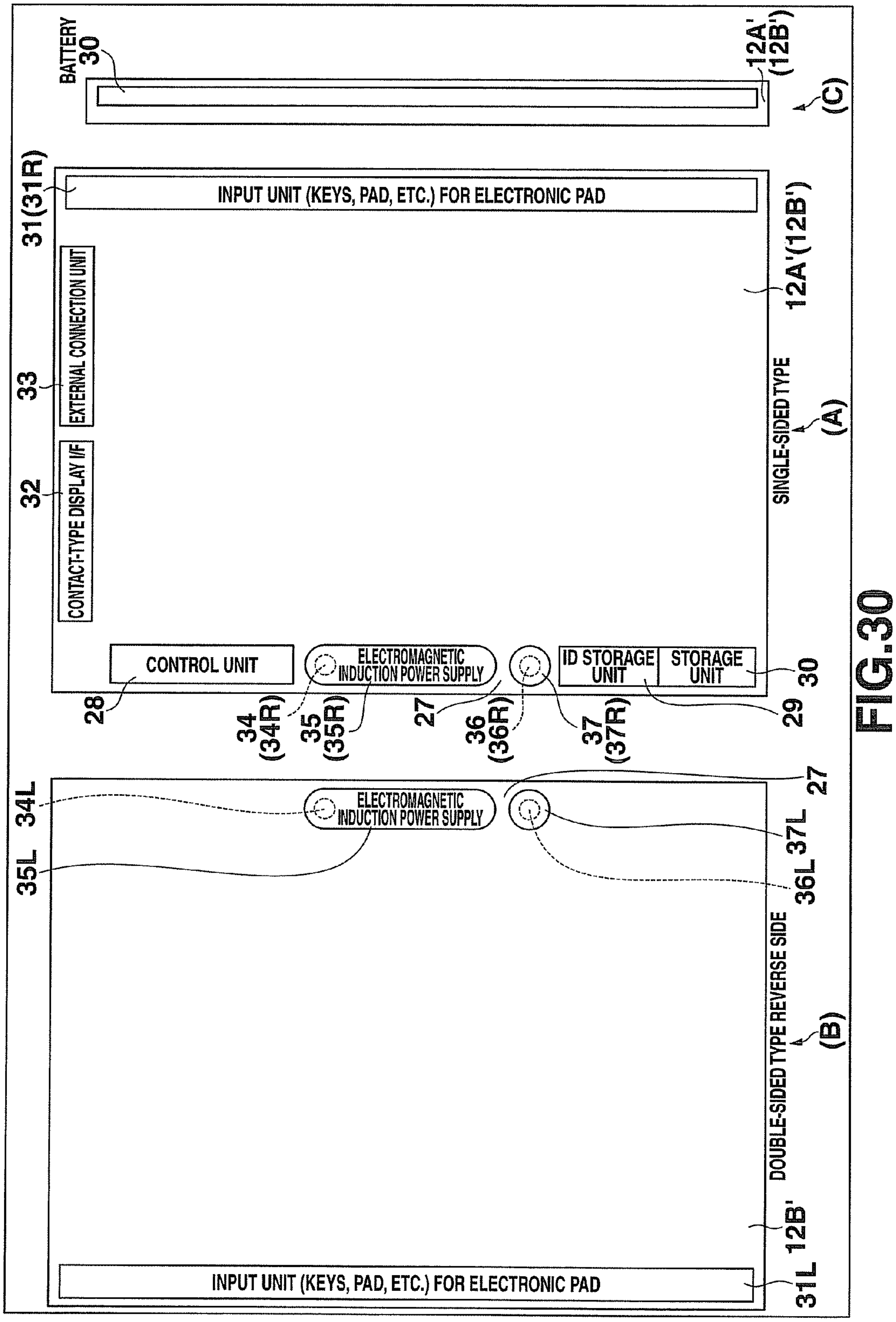
FIG. 30 shows a configuration of electronic pads 12A' and 12B' in the electronic paper recording apparatuses 10A', 10B' according to the second embodiment, (A) being a configuration diagram of the electronic pad (single-sided type) 12A' when viewed from the front side, (B) being a configuration diagram of the left side of the two-page spread electronic pad 12B', and (C) being a vertical cross-sectional view of (the right side of) the electronic pads 12A', 12B'.

FIG. 29 shows a configuration of electronic papers 11A', 11B' in electronic paper recording apparatuses 10A', 10B' according to a second embodiment of the invention, (A) being a configuration of an electronic paper (single-sided type) 11A' when viewed from the obverse side and (B) being a configuration of an electronic paper (double-sided type) 11B' when viewed from the reverse side;

FIG. 30 shows a configuration of electronic pads 12A' and 12B' in the electronic paper recording apparatuses 10A', 10B' according to the second embodiment, (A) being a configuration diagram of an electronic pad (single-sided type) 12A' when viewed from the front side, (B) being a configuration diagram of the left side of the two-page spread electronic pad 12B', and (C) being a vertical cross-sectional view of (the right side of) the electronic pads 12A', 12B'.

In the electronic papers 11A', 11B' and their electronic pads 12A', 12B' of the electronic paper recording apparatuses 10A', 10B' according to the second embodiment shown in FIGS. 29 and 30, the same configuration parts as those in the electronic papers 11A, 11B and their electronic pads 12A, 12B of the electronic paper recording apparatuses 10A, 10B according to the first embodiment shown in FIGS. 3 and 4 are indicated by the same reference numerals and an explanation of them will be omitted.

Like the electronic papers 11A', 11B' in the electronic paper recording apparatuses 10A', 10B' of the second embodiment, a tablet 14T is laid on the display screen of the nonvolatile display unit 17 (17R, 17L) and integrated into an entity. With this configuration, the coordinates of the touch input operation position on the display screen of the nonvolatile display unit 17 (17R, 17L) in the electronic papers 11A', 11B' can be detected directly, which enables handwriting input to be written and displayed on the nonvolatile display unit 17 (17R, 17L).

In this case, since a tablet 14T is incorporated into each of the electronic papers 11A', 11B', . . . , the slenderness of the electronic papers 11A', 11B' is impaired a little and their unit cost rises. However, with this configuration, the detection of positional shift by the tablet 14 or calibration pointers 26*a* to 26*d* in the electronic pads 12A, 12B and its correction process required in the electronic paper recording apparatuses 10A, 10B of the first embodiment become unnecessary and the handwriting input position enables fine writing to be displayed.

Figure 31:
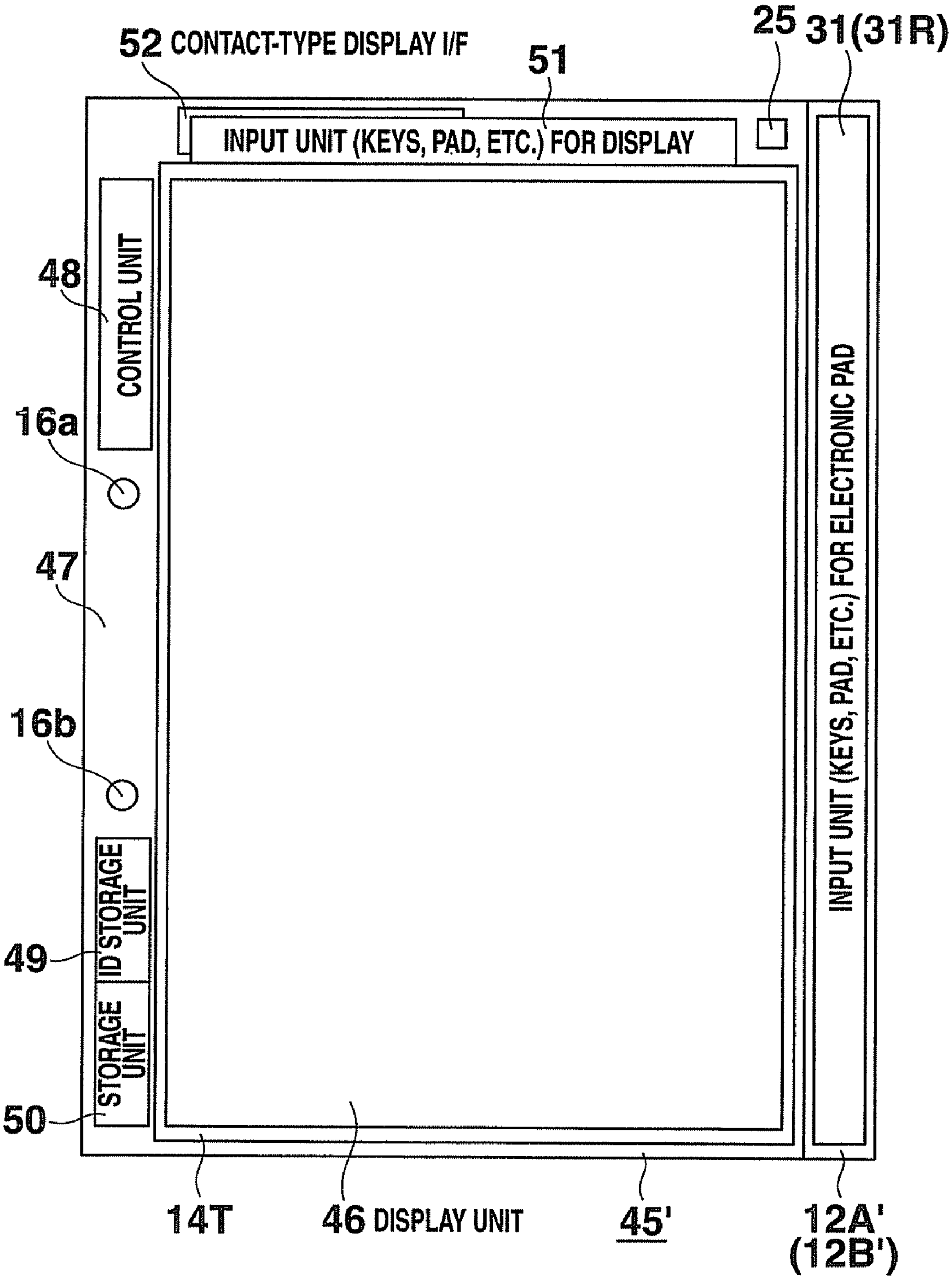
FIG. 31 is a front view of a display unit 45' which is bound in the electronic pads 12A', 12B' and connected to a contact-type display I/F (interface) 32 of the electronic pads for use in the electronic paper recording apparatuses 10A', 10B' of the second embodiment.

FIG. 31 is a front view of a display unit 45' which is bound in the electronic pads 12A', 12B' and connected to a contact-type display I/F (interface) 32 of the electronic pads for use in the electronic paper recording apparatuses 10A', 10B' of the second embodiment.

In the display unit 45' in the electronic paper recording apparatuses 10A', 10B' of the second embodiment shown in FIG. 31, the same configuration parts as those in the display unit 45 in the electronic paper recording apparatuses 10A, 10B of the first embodiment shown in FIG. 10 are indicated by the same reference numerals and an explanation of them will be omitted.

As with the display unit 45' in the electronic paper recording apparatuses 10A', 10B' of the second embodiment, a tablet 14T is laid on the LCD display unit 46 and integrated into an entity, which enables the coordinates of the touch input operation position on the display screen of the LCD display unit 46 to be detected and the handwriting input to be written and displayed on the LCD display unit 46.

Figure 32:
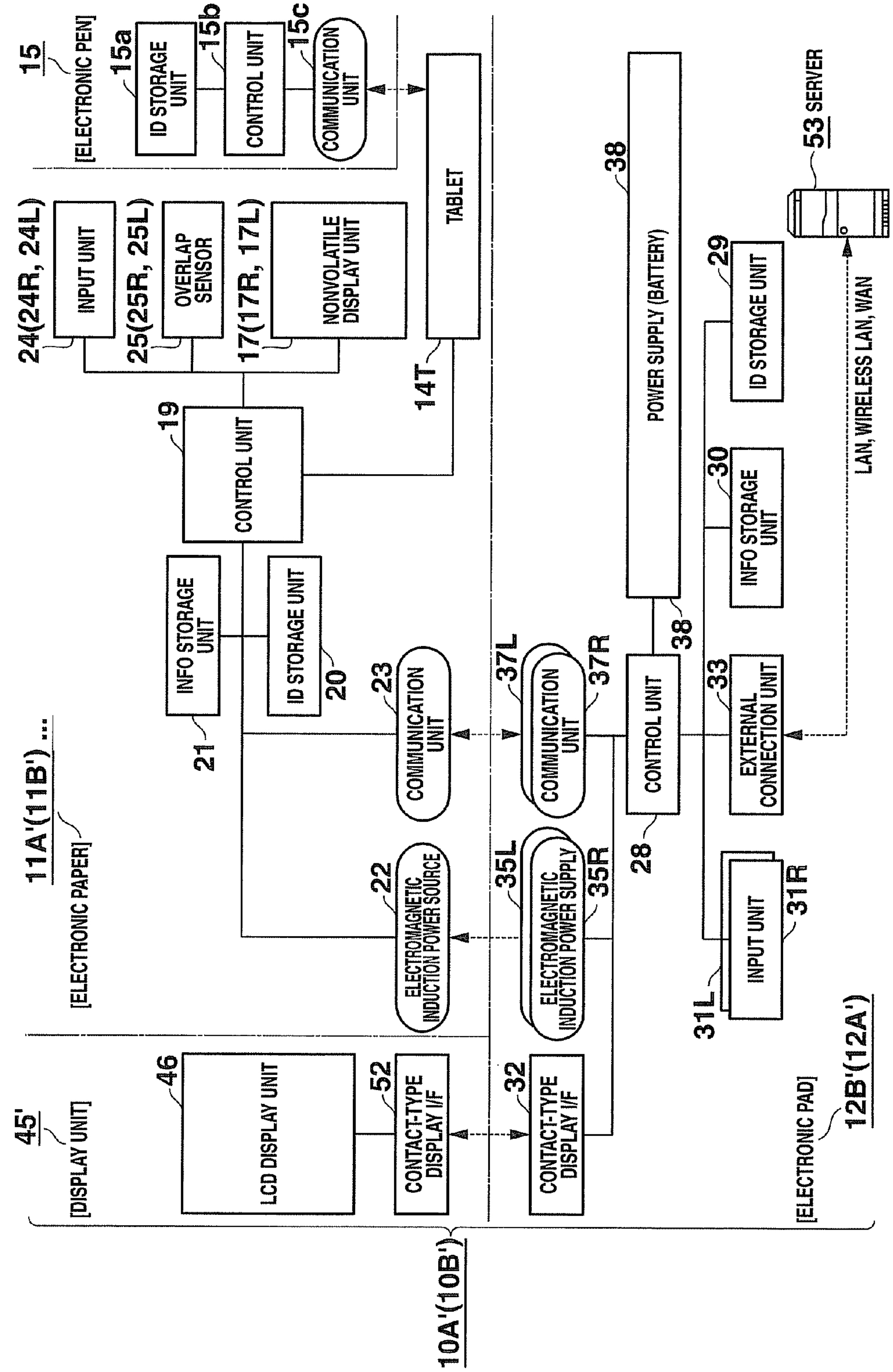
FIG. 32 is a block diagram of an electronic circuit when the electronic paper recording apparatuses 10A', 10B' of the second embodiment are incorporated as terminals into a thin client (server-based computing) system.

FIG. 32 is a block diagram of an electronic circuit when the electronic paper recording apparatuses 10A', 10B' of the second embodiment are incorporated as terminals into a thin client (server-based computing) system.

In the electronic circuit when the electronic paper recording apparatuses 10A', 10B' of the second embodiment are incorporated as terminals into a thin client (server-based computing) system shown in FIG. 32, the same configuration parts as those in the electronic circuit in the electronic paper recording apparatuses 10A, 10B of the first embodiment shown in FIG. 11 are indicated by the same reference numerals and an explanation of them will be omitted.

In the electronic circuit when the electronic paper recording apparatuses 10A', 10B' of the second embodiment are incorporated as terminals into a thin client (server-based computing) system, the tablets 14R, 14L (14) connected to the control unit 28 of the electronic pad 12B' (12A') are unnecessary unlike in the electronic circuit in the electronic paper recording apparatuses 10A, 10B of the first embodiment. The electronic circuit in the second embodiment differs from that in the first embodiment in that the tablet 14T is connected to the control unit 19 of the electronic paper 11A' (11B') and that the calibration pointers 26*a* to 26*d* for detecting the mounting position of the electronic paper are not needed.

Figure 33:
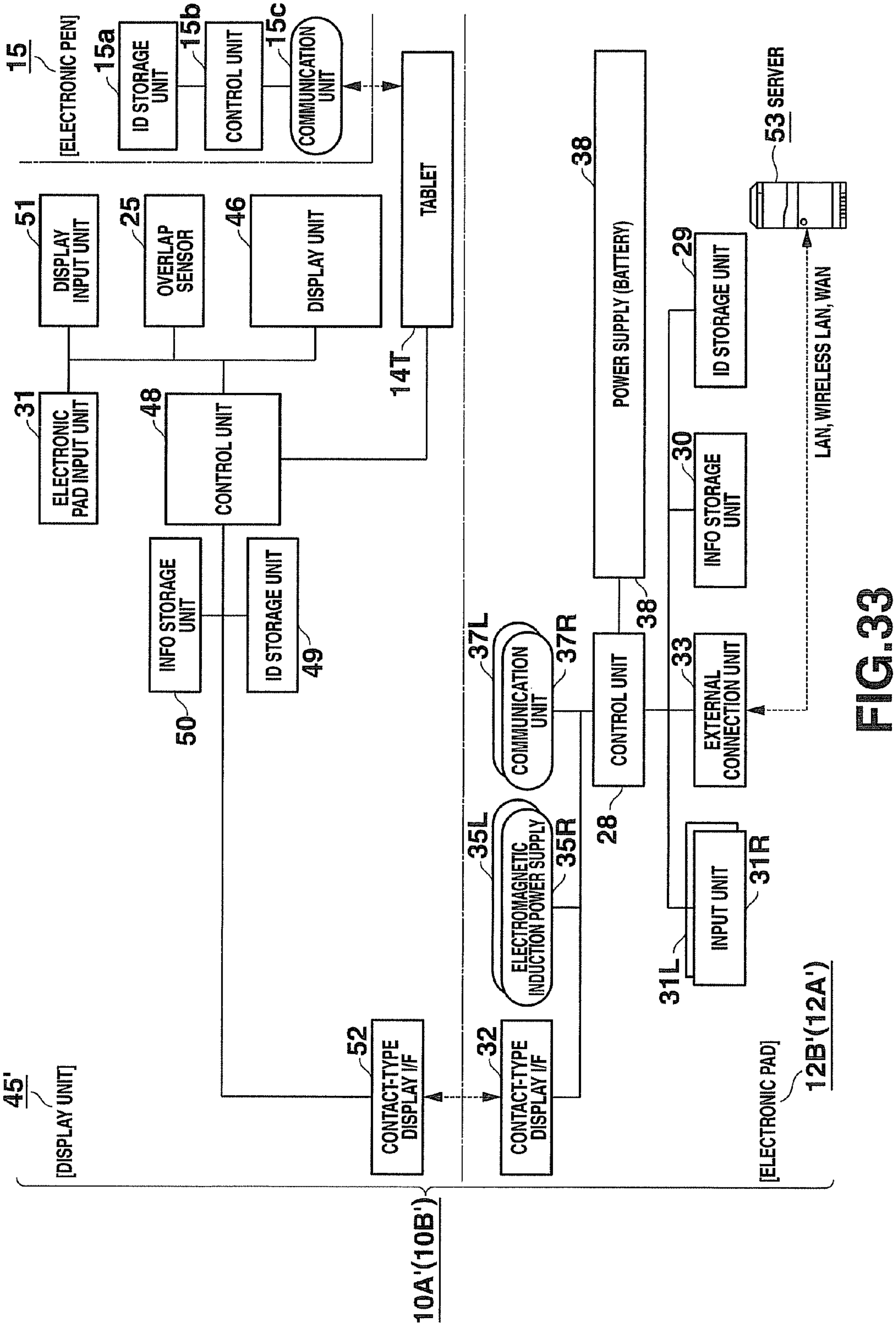
FIG. 33 is a block diagram of an electronic circuit when only a display unit 45' is connected onto the electronic pad 12B' (12A') in a case where the electronic paper recording apparatuses 10A', 10B' of the second embodiment are incorporated as terminals into a thin client (server-based computing) system.

FIG. 33 is a block diagram of an electronic circuit when only a display unit 45' is connected onto the electronic pad 12B' (12A') in a case where the electronic paper recording apparatuses 10A', 10B' of the second embodiment are incorporated as terminals into a thin client (server-based computing) system.

In the electronic circuit where the electronic paper recording apparatuses 10A', 10B' of the second embodiment shown in FIG. 33 have been incorporated as terminals into a thin client (server-based computing) system and only the display unit 45' has been connected, the same configuration parts as those in the electronic circuit with the display unit 45 connected in the electronic paper recording apparatuses 10A, 10B of the first embodiment shown in FIG. 14 are indicated by the same reference numerals and an explanation of them will be omitted.

With this configuration, the tablets 14R, 14L (14) connected to the control unit 28 of the electronic pad 12B' (12A') are unnecessary unlike in the electronic circuit with the display unit 45 connected in the electronic paper recording apparatuses 10A, 10B of the first embodiment. The electronic circuit in the second embodiment differs from that in the first embodiment in that the tablet 14T is connected to the control unit 48 of the display unit 45' and that the calibration pointers 26*a* to 26*d* for detecting the mounting position of the display unit 45' are not needed.

Moreover, as for the operation when the electronic paper recording apparatuses 10A', 10B' of the second embodiment have been incorporated as terminals into the thin client system (see FIGS. 29 to 33), the electronic circuit in the second embodiment differs from that in the first embodiment in that the process of detecting the coordinates of the handwriting input position with the electronic pen 15 on the electronic papers 11A', 11B' is carried out on the basis of the detecting operation of the tablet 14T in the electronic papers 11A', 11B' and that the process of detecting the paper mounting position by the calibration pointers 26*a* to 26*d* and the accompanying display position correcting process are omitted. The remaining operations are almost the same as those explained using the flowcharts of FIGS. 21 to 24, so an explanation of them will be omitted.

Therefore, with the electronic paper recording apparatus 10A' (10B') of the second embodiment, the electronic paper 11A' (11B') having the display screen of the nonvolatile display unit 17 (17R, 17L) over almost all of its surface is mounted on the electronic pad 12A' (12B') with the battery power supply 38 and bound in the binder unit 13 (16), which causes the electronic pad 12A' (12B') to supply electric power to and make a communication connection with the electronic paper 11A' (11B') via the electromagnetic induction unit provided so as to correspond to the bind-in structure of the binder unit 13 (16). Then, when a handwriting input operation is carried out with the electronic pen 15 on the display screen (17R, 17L) of the electronic paper 11A' (11B'), the coordinates of the pen input position are detected by the tablet 14T integrally laid on the display screen (17R, 17L) and then vector data corresponding to the coordinate locus of the pen input position is displayed as display data on the nonvolatile display screen (17R, 17L). This enables not only the display data input from an external information device via the external connection unit 33 of the electronic pad 12A' (12B') to be displayed on the electronic paper 11A' (11B') but also handwritten data directly written with the electronic pen 15 to be displayed. Moreover, since the electronic paper 11A' (11B') can be freely placed on and taken off the electronic pad 12A' (12B'), this enables the electronic paper to be treated as if it were ordinary paper, by describing information, writing information, or erasing information arbitrarily.

While in each of the embodiments of the invention, the communication unit between the electronic paper and the paper mounting unit is of the wireless type, a contact-type communication unit may be used.

Furthermore, while in each of the embodiments of the invention, size information on the electronic paper has been stored in the electronic paper beforehand, positional information on the calibration pointers stored in the electronic paper may be used as size information on the electronic paper.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic paper recording apparatus comprising an electronic paper and a paper mounting unit on which the electronic paper is mounted detachably, the electronic paper including a nonvolatile display unit which uses the paper surface as a nonvolatile display screen, an overlap detecting unit which detects whether another electronic paper is overlapped with the surface of the electronic paper, a mounting state notifying unit which notifies the paper mounting unit that the paper has been mounted so as to correspond to a pad surface of a pad structure unit of the paper mounting unit, a paper size storage unit which stores size information on the electronic paper, and a communication unit which transmits and receives a signal to and from the paper mounting unit, and the paper mounting unit including the pad structure unit which acts as a pad placed under the electronic paper when the paper is mounted including the pad surface, a communication unit which transmits and receives a signal to and from the electronic paper, an operation position detecting unit which detects a user operation position with respect to the display screen of the electronic paper mounted on the pad structure unit, a valid paper determining unit which determines an electronic paper of a minimum size mounted so as to correspond to the pad surface with no overlap to be a valid electronic paper on the basis of an overlap detection signal received from the overlap detecting unit of the electronic paper via the communication unit, the mounting state at the pad structure unit notified by the mounting state notifying unit, and the paper size information read from the paper size storage unit via the communication unit, and a display control unit which transmits data corresponding to the user operation position with respect to the display screen of the electronic paper detected by the operation position detecting unit to the electronic paper determined to be valid by the valid paper determining unit via the communication unit and causes the nonvolatile display unit of the electronic paper to display the data.

2. The electronic paper recording apparatus according to claim 1, further comprising an electronic pen, wherein the operation position detecting unit of the paper mounting unit detects a user operation position by the electronic pen with respect to the display screen of the electronic paper.

3. The electronic paper recording apparatus according to claim 1, wherein the paper mounting unit further includes a power source unit and a power supply unit which supplies electric power output from the power source unit to the electronic paper by wireless, and the electronic paper further includes a power receiving unit which receives by wireless the electric power supplied by wireless from the power supply unit of the paper mounting unit.

4. The electronic paper recording apparatus according to claim 1, wherein the electronic paper further includes a paper identifier storage unit which stores the identifier of the electronic paper, and the paper mounting unit further includes an electronic paper identifying unit which identifies each of a plurality of electronic papers mounted on the paper mounting unit on the basis of the identifier of the electronic paper read from the paper identifier storage unit of the electronic paper via the communication unit.

5. The electronic paper recording apparatus according to claim 1, wherein the communication unit of the paper mounting unit includes a magnetic core which is provided so as to correspond to a bind-in unit of the electronic paper and is for transmitting and receiving a signal by electromagnetic induction, and the communication unit of the electronic paper includes a magnetic core provided so as to correspond to the position of the magnetic core included in the communication unit of the paper mounting unit and a planar toroidal coil which is provided so as to surround the magnetic core and is for transmitting and receiving a signal by electromagnetic induction.

6. The electronic paper recording apparatus according to claim 3, wherein the power supply unit of the paper mounting unit is provided so as to correspond to the bind-in unit of the electronic paper and includes a magnetic core for supplying a power supply voltage signal output from the power source unit to the electronic paper by electromagnetic induction, and the power receiving unit of the electronic paper includes a magnetic core provided so as to correspond to the position of the magnetic core included in the power supply unit of the paper mounting unit and a planar toroidal coil which is provided so as to surround the magnetic core and is for receiving a power supply voltage signal supplied by electromagnetic induction.

7. The electronic paper recording apparatus according to claim 1, wherein the communication unit of the paper mounting unit includes a convex magnetic core which is provided so as to correspond to a bind-in hole of the electronic paper and is for transmitting and receiving a signal by electromagnetic induction, and the communication unit of the electronic paper includes a planar toroidal coil which is provided so as to surround a bind-in hole into which the convex part of the convex magnetic core included in the communication unit of the paper mounting unit is inserted and is for transmitting and receiving a signal by electromagnetic induction.

8. The electronic paper recording apparatus according to claim 3, wherein the power supply unit of the paper mounting unit includes a convex magnetic core which is provided so as to correspond to a bind-in hole of the electronic paper and is for supplying a power supply voltage signal output from the power source unit to the electronic paper by electromagnetic induction, and the power receiving unit of the electronic paper includes a planar toroidal coil which is provided so as to surround a bind-in hole into which the convex part of the convex magnetic core included in the power supply unit of the paper mounting unit is inserted and is for receiving the power supply voltage signal supplied by electromagnetic induction.

9. The electronic paper recording apparatus according to claim 1, wherein the electronic paper further includes a mounting position notifying unit which notifies the paper mounting unit of a mounting position with respect to the paper mounting unit, the paper mounting unit further includes a position correcting unit which corrects a user operation position with respect to the display screen of the electronic paper detected by the operation position detecting unit according to the mounting position notified by the mounting position notifying unit of the electronic paper, and the display control unit transmits data corresponding to the user operation position with respect to the display screen of the electronic paper after the correction by the position correcting unit to the electronic paper via the communication unit and causes the nonvolatile display unit of the electronic paper to display the data.

10. The electronic paper recording apparatus according to claim 1, wherein the operation position detecting unit of the paper mounting unit is composed of a tablet which detects an electromagnetic induction signal generation position, and the mounting state notifying unit of the electronic paper is an electromagnetic induction coil which is provided in the electronic paper and is for generating an electromagnetic induction signal and causing the tablet of the paper mounting unit to detect the signal.

11. The electronic paper recording apparatus according to claim 9, wherein the operation position detecting unit of the paper mounting unit is composed of a tablet which detects an electromagnetic induction signal generation position, and the mounting position notifying unit of the electronic paper is electromagnetic induction coils which are provided in a plurality of places of the electronic paper and which generate electromagnetic induction signals and cause the tablet of the paper mounting unit to detect positions.

12. The electronic paper recording apparatus according to claim 1, wherein the paper mounting unit further includes a soft key control unit which causes the electronic paper to function as a soft keyboard.

13. An electronic paper recording apparatus comprising an electronic paper and a paper mounting unit on which the electronic paper is mounted detachably, the electronic paper including a nonvolatile display unit which uses the paper surface as a nonvolatile display screen, a paper identifier storage unit which stores the identifier of the electronic paper, an overlap detecting unit which detects whether another electronic paper is overlapped with the surface of the electronic paper, a mounting state notifying unit which notifies the paper mounting unit that the paper has been mounted so as to correspond to a pad surface of a pad structure unit of the paper mounting unit, a paper size storage unit which stores size information on the electronic paper, and a communication unit which transmits and receives a signal to and from the paper mounting unit, and the paper mounting unit including the pad structure unit which acts as a pad placed under the electronic paper when the paper is mounted including the pad surface, a communication unit which transmits and receives a signal to and from the electronic paper, an operation position detecting unit which detects a user operation position with respect to the display screen of the electronic paper mounted on the pad structure unit, an external connection unit which connects with a server on an external network, a paper identifier transmitting unit which transmits the identifier of the electronic paper read from the paper identifier storage unit of the electronic paper via the communication unit to the server unit connected by the external connection unit, a user operation position transmitting unit which transmits the user operation position with respect to the display screen of the electronic paper detected by the operation position detecting unit to the server connected by the external connection unit, a valid paper determining unit which determines an electronic paper of a minimum size mounted so as to correspond to the pad surface with no overlap to be a valid electronic paper on the basis of an overlap detection signal received from the overlap detecting unit of the electronic paper via the communication unit, the mounting state at the pad structure unit notified by the mounting state notifying unit, and the paper size information read from the paper size storage unit via the communication unit, and a display control unit which causes the paper identifier transmitting unit to transmit the identifier of the electronic paper to the server unit and which transmits the data received from the server unit to the electronic paper via the communication unit in response to the transmission of the user operation position with respect to the display screen of the electronic paper by the user operation position transmitting unit to the electronic paper determined to be valid by the valid paper determining unit via the communication unit and causes the nonvolatile display unit of the electronic paper to display the data.

14. An electronic paper recording apparatus comprising an electronic paper and a paper mounting unit on which the electronic paper is mounted detachably, the electronic paper including a nonvolatile display unit which uses the paper surface as a nonvolatile display screen, an operation position detecting unit which detects a user operation position with respect to the display screen of the nonvolatile display unit, and an overlap detecting unit which detects whether another electronic paper is overlapped with the surface of the electronic paper, a mounting state notifying unit which notifies the paper mounting unit that the paper has been mounted so as to correspond to a pad surface of a pad structure unit of the paper mounting unit, a paper size storage unit which stores size information on the electronic paper, and a communication unit which transmits and receives a signal to and from the paper mounting unit, and the paper mounting unit including the pad structure unit which acts as a pad placed under the electronic paper when the paper is mounted including the pad surface, a valid paper determining unit which determines an electronic paper of a minimum size mounted so as to correspond to the pad surface with no overlap to be a valid electronic paper on the basis of an overlap detection signal received from the overlap detecting unit of the electronic paper via the communication unit, the mounting state at the pad structure unit notified by the mounting state notifying unit, and the paper size information read from the paper size storage unit via the communication unit, a communication unit which transmits and receives a signal to and from the electronic paper, and a display control unit which receives the user operation position with respect to the display screen detected by the operation position detecting unit of the electronic paper mounted on the pad structure unit via the communication unit and transmits data corresponding to the user operation position to the electronic paper via determined to be valid by the valid paper determining unit the communication unit and which causes the nonvolatile display unit of the electronic paper to display the data.

15. An electronic paper recording apparatus comprising an electronic paper and a paper mounting unit on which the electronic paper is mounted detachably, the electronic paper including a nonvolatile display unit which uses the paper surface as a nonvolatile display screen, an overlap detecting unit which detects whether another electronic paper is overlapped with the surface of the electronic paper, a mounting state notifying unit which notifies the paper mounting unit that the paper has been mounted so as to correspond to a pad surface of a pad structure unit of the paper mounting unit, a paper size storage unit which stores size information on the electronic paper, and a communication unit which transmits and receives a signal to and from the paper mounting unit, and the paper mounting unit including a binder structure unit which clips the electronic paper for mounting and the pad structure unit which acts as a pad placed under the electronic paper when the paper is mounted including the pad surface, a valid paper determining unit which determines an electronic paper of a minimum size mounted so as to correspond to the pad surface with no overlap to be a valid electronic paper on the basis of an overlap detection signal received from the overlap detecting unit of the electronic paper via the communication unit, the mounting state at the pad structure unit notified by the mounting state notifying unit, and the paper size information read from the paper size storage unit via the communication unit, a communication unit which transmits and receives a signal to and from the electronic paper, an external connection unit which connects with an external portable communication device, and a display control unit which transmits data received from the portable communication device via the external connection unit to the electronic paper determined to be valid by the valid paper determining unit via the communication unit and causes the nonvolatile display unit of the electronic paper to display the data.

* * * * *